United States Patent
Steyn et al.

(10) Patent No.: US 9,291,813 B2
(45) Date of Patent: Mar. 22, 2016

(54) SYSTEMS AND METHODS FOR MEMS LIGHT MODULATOR ARRAYS WITH REDUCED ACOUSTIC EMISSION

(75) Inventors: Jasper Lodewyk Steyn, Winchester, MA (US); Jignesh Gandhi, Burlington, MA (US)

(73) Assignee: Pixtronix, Inc., San Diego, CA (US)

( * ) Notice: Subject to any disclaimer, the term of this patent is extended or adjusted under 35 U.S.C. 154(b) by 0 days.

(21) Appl. No.: 13/330,924

(22) Filed: Dec. 20, 2011

(65) Prior Publication Data

US 2012/0154455 A1 Jun. 21, 2012

Related U.S. Application Data

(60) Provisional application No. 61/425,157, filed on Dec. 20, 2010.

(51) Int. Cl.
*G02B 26/02* (2006.01)
*G09G 3/34* (2006.01)

(52) U.S. Cl.
CPC .............. *G02B 26/02* (2013.01); *G09G 3/3433* (2013.01); *G09G 3/3413* (2013.01); *G09G 2300/0456* (2013.01); *G09G 2300/0842* (2013.01); *G09G 2300/0857* (2013.01); *G09G 2310/0235* (2013.01); *G09G 2310/0251* (2013.01); *G09G 2310/0262* (2013.01);
(Continued)

(58) Field of Classification Search
CPC ............................ G02B 26/0841; G02B 26/02

USPC .............. 345/55, 84, 109, 690; 359/290, 230, 359/298, 233, 291, 292

See application file for complete search history.

(56) References Cited

U.S. PATENT DOCUMENTS

| | | | |
|---|---|---|---|
| 4,564,836 A | 1/1986 | Vuilleumier et al. | |
| 4,709,988 A | 12/1987 | Kai et al. | |

(Continued)

FOREIGN PATENT DOCUMENTS

| | | | |
|---|---|---|---|
| EP | 0 786 679 A2 | 7/1997 | |
| EP | 1 091 342 A2 | 4/2001 | |

(Continued)

OTHER PUBLICATIONS

ISR and Written Opinion in PCT/US2011/065980 dated Apr. 12, 2012.

(Continued)

*Primary Examiner* — Koosha Sharifi-Tafreshi
(74) *Attorney, Agent, or Firm* — Weaver Austin Villeneuve & Sampson, LLP

(57) ABSTRACT

Systems and methods for a display having an array of pixels, a substrate, and a control matrix formed on the substrate are described. The array of pixels includes mechanical light modulators that can be referred to as micro-electro-mechanical or MEMS light modulators. The MEMS light modulators may be shutter-based light modulators, and an array of apertures may be formed on the substrate corresponding spatially to the shutters in the array of shutter-based light modulators. Each modulator is configured to be driven from a-light-blocking state to a-light-transmissive state through a movement direction. The array of light modulators are arranged to reduce the correlations in movement directions of neighboring pixels, thereby reducing the amplitude of acoustic emissions from the display.

33 Claims, 20 Drawing Sheets

(52) U.S. Cl.
CPC ... *G09G 2320/041* (2013.01); *G09G 2360/144* (2013.01); *Y10T 29/49002* (2015.01)

(56) References Cited

U.S. PATENT DOCUMENTS

| | | | |
|---|---|---|---|
| 4,728,936 A | 3/1988 | Guscott et al. | |
| 5,044,734 A | 9/1991 | Sperl et al. | |
| 5,062,689 A | 11/1991 | Koehler | |
| 5,096,279 A | 3/1992 | Hornbeck et al. | |
| 5,142,405 A | 8/1992 | Hornbeck | |
| 5,233,459 A | 8/1993 | Bozler et al. | |
| 5,319,491 A | 6/1994 | Selbrede | |
| 5,339,179 A | 8/1994 | Rudisill et al. | |
| 5,450,230 A | 9/1995 | Masuda et al. | |
| 5,517,347 A | 5/1996 | Sampsell | |
| 5,691,695 A | 11/1997 | Lahiff | |
| 5,745,281 A | 4/1998 | Yi et al. | |
| 5,781,331 A | 7/1998 | Carr et al. | |
| 5,784,189 A | 7/1998 | Bozler et al. | |
| 5,794,761 A | 8/1998 | Renaud et al. | |
| 5,835,256 A | 11/1998 | Huibers | |
| 5,986,796 A | 11/1999 | Miles | |
| 6,031,656 A | 2/2000 | Little et al. | |
| 6,034,807 A | 3/2000 | Little et al. | |
| 6,046,840 A | 4/2000 | Huibers | |
| 6,069,676 A | 5/2000 | Yuyama | |
| 6,195,195 B1 | 2/2001 | Chethik | |
| 6,201,633 B1 | 3/2001 | Peeters et al. | |
| 6,288,824 B1 | 9/2001 | Kastalsky | |
| 6,288,829 B1 | 9/2001 | Kimura et al. | |
| 6,300,154 B2 | 10/2001 | Clark et al. | |
| 6,323,834 B1 | 11/2001 | Colgan et al. | |
| 6,407,851 B1 | 6/2002 | Islam et al. | |
| 6,411,423 B2 | 6/2002 | Ham et al. | |
| 6,514,111 B2 | 2/2003 | Ebihara et al. | |
| 6,583,915 B1 | 6/2003 | Hong et al. | |
| 6,600,474 B1 | 7/2003 | Heines et al. | |
| 6,643,065 B1 | 11/2003 | Silberman | |
| 6,650,455 B2 | 11/2003 | Miles | |
| 6,671,078 B2 | 12/2003 | Flanders et al. | |
| 6,674,562 B1 | 1/2004 | Miles | |
| 6,680,792 B2 | 1/2004 | Miles | |
| 6,701,039 B2 | 3/2004 | Bourgeois et al. | |
| 6,775,048 B1 | 8/2004 | Starkweather et al. | |
| 6,798,935 B2 | 9/2004 | Bourgeois et al. | |
| 6,827,456 B2 | 12/2004 | Parker et al. | |
| 6,912,082 B1* | 6/2005 | Lu et al. | 359/295 |
| 6,969,635 B2 | 11/2005 | Patel et al. | |
| 7,050,219 B2 | 5/2006 | Kimura | |
| 7,123,796 B2 | 10/2006 | Steckl et al. | |
| 7,140,751 B2 | 11/2006 | Lin | |
| 7,227,677 B2 | 6/2007 | Ravnkilde et al. | |
| 7,271,945 B2 | 9/2007 | Hagood et al. | |
| 7,274,416 B2 | 9/2007 | Feenstra et al. | |
| 7,304,785 B2 | 12/2007 | Hagood et al. | |
| 7,304,786 B2 | 12/2007 | Hagood et al. | |
| 7,920,314 B2 | 4/2011 | Nerden | |
| 8,233,114 B2 | 7/2012 | Mimura et al. | |
| 2003/0128218 A1 | 7/2003 | Struyk | |
| 2003/0156422 A1 | 8/2003 | Tatewaki et al. | |
| 2003/0164814 A1* | 9/2003 | Starkweather et al. | 345/102 |
| 2004/0080484 A1 | 4/2004 | Heines et al. | |
| 2004/0125062 A1 | 7/2004 | Yamamoto et al. | |
| 2004/0136680 A1 | 7/2004 | Medina et al. | |
| 2004/0196525 A1 | 10/2004 | Fujii et al. | |
| 2005/0052681 A1 | 3/2005 | Kogi | |
| 2005/0088404 A1 | 4/2005 | Heines et al. | |
| 2005/0104804 A1 | 5/2005 | Feenstra et al. | |
| 2005/0195468 A1 | 9/2005 | Sampsell | |
| 2005/0225827 A1 | 10/2005 | Kastalsky | |
| 2006/0187190 A1 | 8/2006 | Hagood et al. | |
| 2006/0187191 A1 | 8/2006 | Hagood et al. | |
| 2006/0187528 A1 | 8/2006 | Hagood et al. | |
| 2006/0187529 A1 | 8/2006 | Hagood et al. | |
| 2006/0187530 A1* | 8/2006 | Hagood et al. | 359/298 |
| 2006/0209000 A1 | 9/2006 | Sumiyoshi et al. | |
| 2006/0209012 A1 | 9/2006 | Hagood | |
| 2006/0250325 A1* | 11/2006 | Hagood et al. | 345/55 |
| 2006/0250676 A1 | 11/2006 | Hagood | |
| 2006/0256039 A1 | 11/2006 | Hagood et al. | |
| 2007/0002156 A1 | 1/2007 | Hagood et al. | |
| 2007/0086078 A1 | 4/2007 | Hagood et al. | |
| 2007/0091038 A1 | 4/2007 | Hagood et al. | |
| 2007/0195026 A1 | 8/2007 | Hagood et al. | |
| 2007/0205969 A1 | 9/2007 | Hagood et al. | |
| 2007/0216987 A1 | 9/2007 | Hagood et al. | |
| 2007/0223080 A1 | 9/2007 | Hagood et al. | |
| 2007/0279347 A1 | 12/2007 | Muneyoshi et al. | |
| 2007/0279727 A1 | 12/2007 | Gandhi et al. | |
| 2008/0013145 A1* | 1/2008 | Chui et al. | 359/224 |
| 2008/0030827 A1 | 2/2008 | Hagood et al. | |
| 2008/0037104 A1 | 2/2008 | Hagood et al. | |
| 2008/0049294 A1 | 2/2008 | Bartzke et al. | |
| 2008/0062500 A1* | 3/2008 | Hagood, IV | 359/230 |
| 2008/0158635 A1* | 7/2008 | Hagood et al. | 359/230 |
| 2008/0165122 A1 | 7/2008 | Duthaler et al. | |
| 2010/0118373 A1 | 5/2010 | Kim | |
| 2011/0043504 A1 | 2/2011 | Chang | |
| 2011/0043882 A1 | 2/2011 | Yoon et al. | |
| 2011/0090554 A1 | 4/2011 | Tung | |
| 2011/0235147 A1* | 9/2011 | Lee et al. | 359/230 |
| 2012/0026205 A1 | 2/2012 | Yoon et al. | |
| 2012/0250138 A1 | 10/2012 | Yasui et al. | |
| 2012/0280971 A1 | 11/2012 | Hagood et al. | |
| 2014/0218374 A1 | 8/2014 | Shi et al. | |

FOREIGN PATENT DOCUMENTS

| | | |
|---|---|---|
| EP | 1734502 | 12/2006 |
| JP | 2000214393 A | 8/2000 |
| JP | 2005221917 A | 8/2005 |
| JP | 2008275985 A | 11/2008 |
| JP | 2010197778 A | 9/2010 |
| JP | 2011209689 | 10/2011 |
| TW | 201211975 A | 3/2012 |
| TW | 201235886 A | 9/2012 |
| WO | WO-2004104648 A1 | 12/2004 |
| WO | WO-2006/017129 | 2/2006 |

OTHER PUBLICATIONS

Ravnkilde et al, "Fabrication of Nickel Microshutter Arrays for Spatial Light Modulation," Meso 2002, also on their website: http://www2.mic.dtu.dk/research/mems/publications/Papers/Dicon_Meso2002.pdf (2002).

Wang et al., "Highly Space-Efficient Electrostatic Zigzag Transmissive Micro-Optic Switches for an Integrated MEMS Optical Display System" Transducers 03 Conference, 1:575-575 (Jun. 8-12, 2003).

Taiwan Search Report—TW103103827—TIPO—Nov. 10, 2014.

Taiwan Search Report—TW100147296—TIPO—Aug. 18, 2015.

Chinese First Office Action Dated Jan. 15, 2015 Issued in CN 201180067932.2.

Chinese Second Office Action Dated Aug. 4, 2015 Issued in CN 201180067932.2.

Japanese Second Office Action Dated Feb. 10, 2015 Issued in JP 2013-546303.

Japanese Decision of Rejection Dated Oct. 13, 2015 Issued in JP 2013-546303.

Taiwanese First Office Action Dated Sep. 2, 2015 Issued in TW100147296.

* cited by examiner

SYSTEMS AND METHODS FOR MEMS LIGHT MODULATOR ARRAYS WITH REDUCED ACOUSTIC EMISSION

CROSS-REFERENCE

This application claims the benefit of U.S. Provisional Patent Application No. 61/425,157, entitled "Systems and Methods for MEMS Light Modulator Arrays with Reduced Acoustic Emissions," and filed on Dec. 20, 2010, the entirety of which is incorporated herein by reference.

TECHNICAL FIELD

In general, the application relates to the field of light modulation arrays, including their application to imaging displays. In particular, the application relates to light modulator arrays which are designed to operate with reduced acoustic emission and audible noise.

DESCRIPTION OF THE RELATED TECHNOLOGY

Displays built from mechanical light modulators are an attractive alternative to displays based on liquid crystal technology. Mechanical light modulators are fast enough to display video content with good viewing angles and with a wide range of color and grey scale. Mechanical light modulators have been successful in projection display applications, and have recently been proposed for direct view applications.

SUMMARY

While a number of display prototypes built from mechanical light modulators have been produced in recent years, many of these produce undesirable audible noise. A display built from an array of mechanical light modulators can include many tens of thousands of light modulators, at least one for each pixel of the display, and can include up to many millions of light modulators. The motion of each light modulator is controlled by the commands directed through the control matrix, sometimes referred to as the backplane circuit. For video operation, the operational state of the individual light modulators can be changed from 50 times per second up to 50,000 times per second. As a consequence, with many thousands of shutter assemblies moving over time scales characteristic of audible frequencies, the displays are capable of emitting undesirable acoustic noise as a byproduct.

Individual pixels in a display assembly are often only tens of microns to hundreds of microns in size, while commonplace images in a display can have regions of uniform color or contrast which can measure millimeters or even centimeters. It is therefore a common occurrence that many tens or many hundreds of light modulators in a neighboring region of a display are caused to move by signals from the control matrix with similar motions and with similar timing signals. This synchronization or correlation of the movements of neighboring pixels contributes to the amplitude of the acoustic emissions.

Designs for the array of light modulators are therefore sought which can reduce correlations in the movement directions of neighboring MEMS light modulators, and thereby reduce the amplitude of acoustic emissions.

According to one aspect, the present disclosure relates to a display including a substrate, an array of apertures formed on the substrate, and an array of MEMS light modulators formed in spatial correspondence to the array of apertures. The array of MEMS light modulators includes a first group of modulators configured to be driven from a-light-blocking state to a-light-transmissive state through movement in a first direction. The array further includes a second group of MEMS light modulators configured to be driven from a light-blocking state to a light-transmissive state through movement in a second direction. The second direction is substantially different from the first direction. In one implementation, the substrate is transparent.

In some implementations, the first direction and the second direction are planar opposite directions. In alternate implementations, the second direction can be rotated about 90, 60, or 45 degrees relative to the first direction. The array of light modulators are also arranged to reduce the correlations in the movement directions of neighboring MEMS light modulators. In an implementation, the light modulators of the first and second groups are arranged in alternating groups of columns, with each group including at least one column. In another implementation, the light modulators of the first and second groups are arranged in alternating groups of rows, with each group including one or more rows. In yet another implementation the light modulators of the first and second groups are arranged in alternating clusters, with each cluster including at least one modulator. In some implementations, the spatial period of alternation between the two groups of light modulators is less than about the thickness of the substrate with the array of apertures. In yet another implementation the light modulators of the first and second groups are arranged in a randomized fashion.

In some implementations, the MEMS light modulators may be shutter-based light modulators. In some implementations, the light modulators can include a third state whereby the shutter does not completely block the light from the corresponding aperture.

In some implementations, the display apparatus includes a control matrix and a driver chip formed on the first substrate for transmitting data and actuation voltages to the array. The display apparatus also includes a controller which stores in memory which of the first and second directions of movement is appropriate to achieve the-light-transmissive state for each light modulator in the array.

In some implementations, the control matrix is configured with distinct wiring layouts for actuating the two groups in substantially different directions. In alternate implementations, the controller stores in memory a map of the first and second groups of light modulators in the array and their associated direction of movement to achieve the active state. The controller processes the pixel data prior to sending it through the control matrix to determine the proper direction of movement for each pixel.

According to another aspect, the present disclosure relates to a method for manufacturing a display. The method includes forming an array of apertures on a substrate and fabricating a first group of MEMS light modulators on the substrate in spatial correspondence to the array of apertures such that the light modulators in the first group of MEMS light modulators are configured to actuate from a light-blocking state to a light-transmissive state through movement in a first direction. The method further includes fabricating a second group of MEMS light modulators on the substrate in spatial correspondence to the array of apertures such that the light modulators in the second group of MEMS light modulators are configured to actuate from a light-blocking state to a light-transmissive state through movement in a second direction. The second direction is substantially different from the first direction.

According to another aspect, the present disclosure relates to a system for modulating light to form an image on a display.

The system includes an array of apertures on a substrate and an array of MEMS light modulators arranged in spatial correspondence to the array of apertures. The system further includes means for actuating a first group of MEMS light modulators in the array of MEMS light modulators from a light-blocking state to a-light-transmissive state by initiating movement of the MEMS light modulators in a first direction, and means for actuating a second group of MEMS light modulators in the array of MEMS light modulators from a light-blocking state to a light-transmissive state by initiating movement of the MEMS light modulators in a second direction. The second direction is substantially different from the first direction.

According to another aspect, the present disclosure relates to a method for modulating light to form an image on a display that includes an array of apertures on a substrate and an array of MEMS light modulators arranged in spatial correspondence to the array of apertures. The method includes actuating a first group of MEMS light modulators in the array of MEMS light modulators from a light-blocking state to a-light-transmissive state by initiating movement of the MEMS light modulators in a first direction. The method further includes actuating a second group of MEMS light modulators in the array of MEMS light modulators from a light-blocking state to a light-transmissive state by initiating movement of the MEMS light modulators in a second direction. The second direction is substantially different from the first direction.

DETAILED DESCRIPTION

To provide an overall understanding of certain apparatus and methods for displaying images, certain illustrative implementations will now be described. However, it will be understood by a person or one having ordinary skill in the art that the systems and methods described herein may be adapted and modified as is appropriate for the application being addressed and that the systems and methods described herein may be employed in other suitable applications, and that such other additions and modifications will not depart from the scope hereof.

The present disclosure relates to a MEMS-based display that includes an array of MEMS light modulators, such as MEMS shutters. The MEMS light modulators modulate light passing through corresponding apertures. If many of the MEMS light modulators were to move in concert over time scales characteristic of audible frequencies, such a display may emit undesirable acoustic noise as a byproduct. In part to prevent such noise emissions, the displays disclosed herein include light modulators which actuate from light-emitting states to light-blocking states in substantially different directions.

Figure 1A:
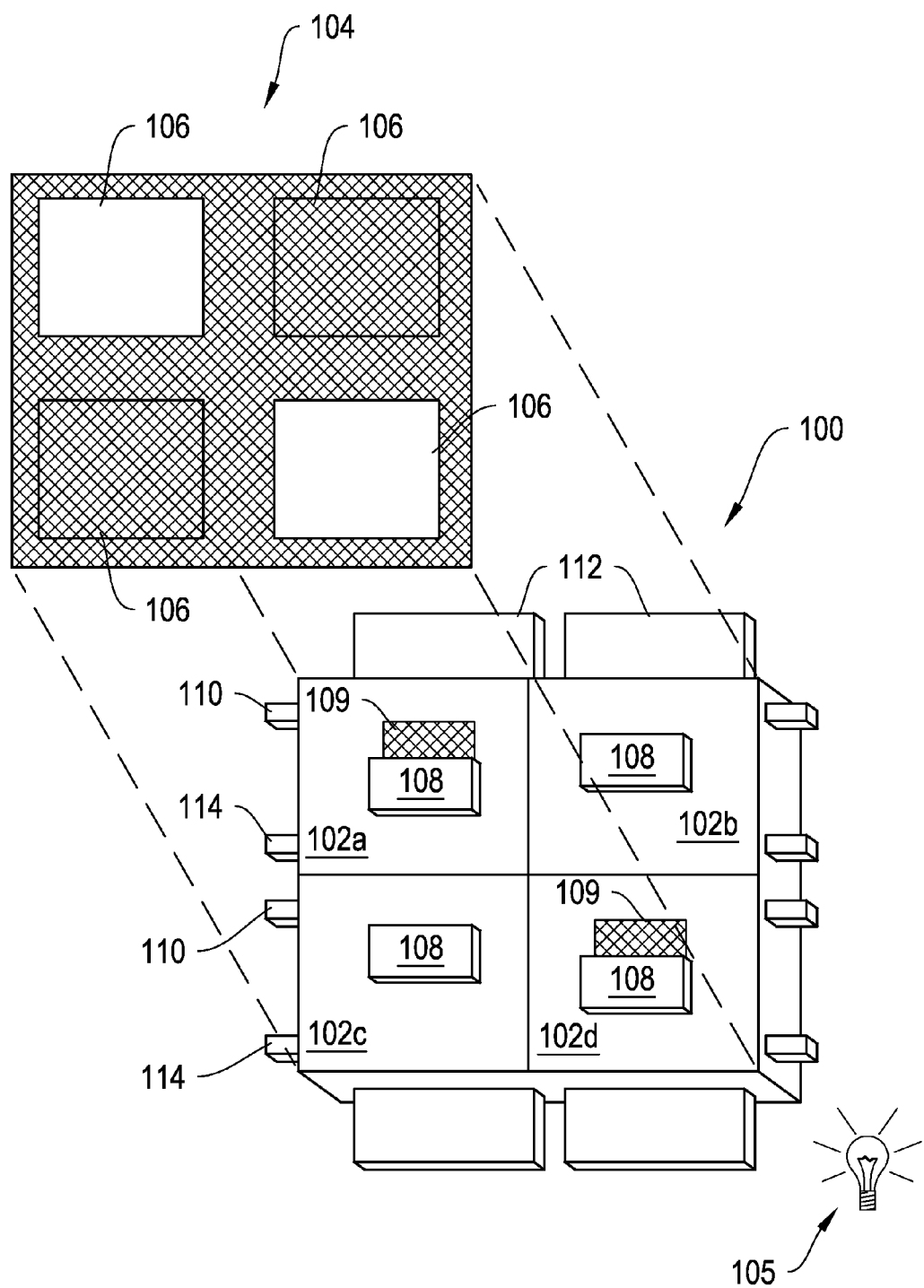
FIG. 1A is an example of a display apparatus, according to an illustrative implementation.

FIG. 1A is an example of a display apparatus 100, according to an illustrative implementation. The display apparatus 100 includes a plurality of light modulators 102a-102d (generally "light modulators 102") arranged in rows and columns. In the display apparatus 100, light modulators 102a and 102d are in the open state, allowing light to pass. Light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105.

In another implementation, described further below, the apparatus may form an image by reflection of ambient light originating from the front of the apparatus. In another implementation, the apparatus may form an image by reflection of light from a lamp or lamps positioned in the front of the display, i.e. by use of a frontlight. In still another implementation, the apparatus may work in a transflective mode, reflecting both ambient light originating from the front of the apparatus and light from a backlight. In general, in one of the closed or open states, the light modulators 102 interfere with light in an optical path by, for example, and without limitation, blocking, reflecting, absorbing, filtering, polarizing, diffracting, or otherwise altering a property or path of the light.

In the display apparatus 100, each light modulator 102 corresponds to a pixel 106 in the image 104. In other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide grayscale in an image 104. With respect to an image, a "pixel" corresponds to the smallest picture element defined by the resolution of the image. With respect to structural components of the display apparatus 100, the term "pixel" refers to the combined mechanical and electrical components utilized to modulate the light that forms a single pixel of the image.

Display apparatus 100 is a direct-view display in that it does not require-imaging optics. The user sees an image by looking directly at the display apparatus 100. In alternate implementations the display apparatus 100 is incorporated into a projection display. In such implementations, the display forms an image by projecting light onto a screen or onto a wall. In projection applications the display apparatus 100 is substantially smaller than the projected image 104.

Direct-view displays may operate in either a transmissive or reflective mode. In a transmissive display, the light modulators filter or selectively block light which originates from a lamp or lamps positioned behind the display. The light from the lamps is optionally injected into a light guide or "backlight". Transmissive direct-view display implementations are built onto plastic or glass substrates to facilitate a sandwich assembly arrangement where one substrate, containing the light modulators, is positioned directly on top of the backlight. In some transmissive display implementations, a white lamp is used, and color-specific light modulators are created by associating a color filter material with each modulator 102. In other transmissive display implementations colors can be generated, as described below, using a field sequential color method by alternating illumination of lamps with different primary colors.

Each light modulator 102 includes a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material. In transflective implementations, each light modulator modulates both light from the backlight 105, as well as ambient light. In one particular implementation, the apertures are not completely cleared of the reflective material that would otherwise be etched away to form the aperture. The remaining reflective material reflects incident light back towards a viewer to form a part of the image 104. In another implementation, the apertures are fully cleared, and the ambient light is reflected by a front-facing reflective layer positioned behind the lamp 105.

In reflective implementations of the display, instead of including a backlight 105 and apertures 109, a light absorbing material is applied to the top surface of the substrate in place of the apertures 109, and a light reflecting material is applied to the top surface of the light modulators 102. Alternatively, a light reflecting material is applied to the top surface of the substrate in place of the aperture 109, and a light absorbing material is applied to the top surface of the light modulators 102. By selectively setting the states of the light modulators 102a-102d, incident light from the ambient or a front light can be selectively reflected or absorbed to form an image 104.

The display apparatus also includes a control matrix connected to the substrate and to the light modulators for controlling the movement of the shutters. The control matrix includes a series of electrical interconnects (e.g., interconnects 110, 112, and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{we}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In other implementations, the data voltage pulses control switches, e.g., transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
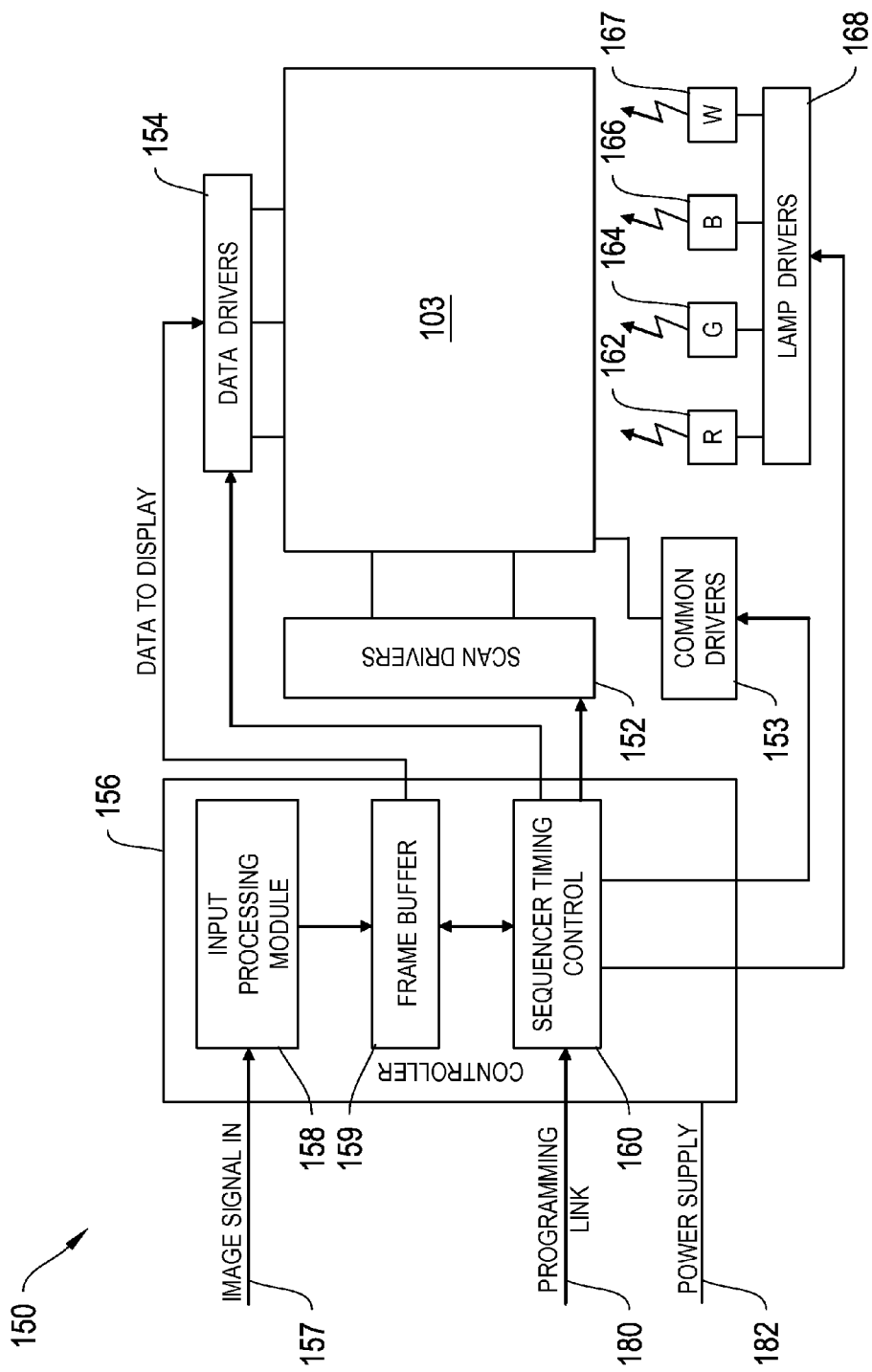
FIG. 1B is a block diagram of the display apparatus of FIG. 1A, according to an illustrative implementation.

FIG. 1B is a block diagram 150 of the display apparatus 100 of FIG. 1A, according to one illustrative implementation. Referring to FIGS. 1A and 1B, in addition to the elements of the display apparatus 100 described above, as depicted in the block diagram 150, the display apparatus 100 includes a plurality of scan drivers 152 (also referred to as "write enabling voltage sources") and a plurality of data drivers 154 (also referred to as "data voltage sources"). The scan drivers 152 apply write enabling voltages to scan-line interconnects 110. The data drivers 154 apply data voltages to the data interconnects 112. In some implementations of the display apparatus, the data drivers 154 are configured to provide analog data voltages to the light modulators, especially where the gray scale of the image 104 is to be derived in analog fashion. In analog operation the light modulators 102 are designed such that when a range of intermediate voltages is applied through the data interconnects 112 there results a range of intermediate open states in the shutters 108 and therefore a range of intermediate illumination states or gray scales in the image 104.

In other cases the data drivers 154 are configured to apply only a reduced set of 2, 3, or 4 digital voltage levels to the control matrix. These voltage levels are designed to set, in digital fashion, either an open state or a closed state to each of the shutters 108.

The scan drivers 152 and the data drivers 154 are connected to digital controller circuit 156 (also referred to as the "controller 156"). The controller 156 includes an input processing module 158, which processes an incoming image signal 157 into a digital image format appropriate to the spatial addressing and the gray scale capabilities of the display 100. The pixel location and gray scale data of each image is stored in a frame buffer 159 so that the data can be fed out as needed to the data drivers 154. The data is sent to the data drivers 154 in mostly serial fashion, organized in predetermined sequences grouped by rows and by image frames. The data drivers 154 can include series to parallel data converters, level shifting, and for some applications digital to analog voltage converters.

The display 100 apparatus optionally includes a set of common drivers 153, also referred to as common voltage sources. In some implementations the common drivers 153 provide a DC common potential to all light modulators within the array of light modulators 103, for instance by supplying voltage to a series of common interconnects 114. In other implementations the common drivers 153, following commands from the controller 156, issue voltage pulses or signals to the array of light modulators 103, for instance global actuation pulses which are capable of driving and/or initiating simultaneous actuation of all light modulators in multiple rows and columns of the array 103.

All of the drivers (e.g., scan drivers 152, data drivers 154, and common drivers 153) for different display functions are time-synchronized by a timing-control module 160 in the controller 156. Timing commands from the module 160 coordinate the illumination of red, green and blue and white lamps (162, 164, 166, and 167 respectively) via lamp drivers 168, the write-enabling and sequencing of specific rows within the array of pixels 103, the output of voltages from the data drivers 154, and the output of voltages that provide for light modulator actuation.

The controller 156 determines the sequencing or addressing scheme by which each of the shutters 108 in the array 103 can be re-set to the illumination levels appropriate to a new image 104. Details of suitable addressing, image formation, and gray scale techniques can be found in U.S. patent application Ser. Nos. 11/326,696 and 11/643,042, incorporated herein by reference. New images 104 can be set at periodic intervals. For instance, for video displays, the color images 104 or frames of video are refreshed at frequencies ranging from 10 to 300 Hertz. In some implementations the setting of an image frame to the array 103 is synchronized with the illumination of the lamps 162, 164, and 166 such that alternate image frames are illuminated with an alternating series of colors, such as red, green, and blue. The image frames for each respective color is referred to as a color sub-frame. In this method, referred to as the field sequential color method, if the color sub-frames are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, and blue.

In some implementations, where the display apparatus 100 is designed for the digital switching of shutters 108 between open and closed states, the controller 156 determines the addressing sequence and/or the time intervals between image frames to produce images 104 with appropriate gray scale. The process of generating varying levels of grayscale by controlling the amount of time a shutter 108 is open in a particular frame is referred to as time division gray scale. In one implementation of time division gray scale, the controller 156 determines the time period or the fraction of time within each frame that a shutter 108 is allowed to remain in the open state, according to the illumination level or gray scale desired of that pixel. In other implementations, for each image frame, the controller 156 sets a plurality of sub-frame images in multiple rows and columns of the array 103, and the controller alters the duration over which each sub-frame image is illuminated in proportion to a gray scale value or significance value employed within a coded word for gray scale. For instance, the illumination times for a series of sub-frame images can be varied in proportion to the binary coding series 1, 2, 4, 8 . . . . The shutters 108 for each pixel in the array 103 are then set to either the open or closed state within a sub-frame image according to the value at a corresponding position within the pixel's binary coded word for gray level.

In other implementations, the controller alters the intensity of light from the lamps 162, 164, and 166 in proportion to the gray scale value desired for a particular sub-frame image. A number of hybrid techniques are also available for forming colors and gray scale from an array of shutters 108. For instance, the time division techniques described above can be combined with the use of multiple shutters 108 per pixel, or the gray scale value for a particular sub-frame image can be established through a combination of both sub-frame timing and lamp intensity. Details of these and other implementations can be found in U.S. patent application Ser. No. 11/643, 042, referenced above.

In some implementations the data for an image state 104 is loaded by the controller 156 to the modulator array 103 by a sequential addressing of individual rows, also referred to as scan lines. For each row or scan line in the sequence, the scan driver 152 applies a write-enable voltage to the write enable interconnect 110 for that row of the array 103, and subsequently the data driver 154 supplies data voltages, corresponding to desired shutter states, for each column in the selected row. This process repeats until data has been loaded for all rows in the array. In some implementations the sequence of selected rows for data loading is linear, proceeding from top to bottom in the array. In other implementations the sequence of selected rows is pseudo-randomized, in order to minimize visual artifacts. And in other implementations the sequencing is organized by blocks, where, for a block, the data for only a certain fraction of the image state 104 is loaded to the array, for instance by addressing only every $5^{th}$ row of the array in sequence.

In some implementations, the process for loading image data to the array 103 is separated in time from the process of actuating the shutters 108. In these implementations, the modulator array 103 may include data memory elements for each pixel in the array 103 and the control matrix may include a global actuation interconnect for carrying trigger signals, from common driver 153, to initiate simultaneous actuation of shutters 108 according to data stored in the memory elements. Various addressing sequences, many of which are described in U.S. patent application Ser. No. 11/643,042, can be coordinated by means of the timing control module 160.

In alternative implementations, the array of pixels 103 and the control matrix that controls the pixels may be arranged in configurations other than rectangular rows and columns. For example, the pixels can be arranged in hexagonal arrays or curvilinear rows and columns. In general, as used herein, the term scan-line shall refer to any plurality of pixels that share a write-enabling interconnect.

In some implementations, the array of modulators may be divided into two or more groups with different spatial orientations with respect to their respective apertures. The input processing module 158 may additionally store a map of the spatial orientation of each pixel and process control signals prior to sending them on to the control matrix to determine the direction of motion to actuate each modulator from a light-blocking state to a light-transmissive state.

The display 100 includes a plurality of functional blocks including the timing control module 160, the frame buffer 159, scan drivers 152, data drivers 154, and drivers 153 and 168. Each block can be understood to represent either a distinguishable hardware circuit and/or a module of executable code. In some implementations the functional blocks are provided as distinct chips or circuits connected together by means of circuit boards and/or cables. Alternately, many of these circuits can be fabricated along with the pixel array 103 on the same substrate of glass or plastic. In other implementations, multiple circuits, drivers, processors, and/or control functions from block diagram 150 may be integrated together within a single silicon chip, which is then bonded directly to the transparent substrate holding pixel array 103.

The controller 156 includes a programming link 180 by which the addressing, color, and/or gray scale algorithms, which are implemented within controller 156, can be altered according to the needs of particular applications. In some implementations, the programming link 180 conveys information from environmental sensors, such as ambient light or temperature sensors, so that the controller 156 can adjust imaging modes or backlight power in correspondence with environmental conditions. The controller 156 also includes a power supply input 182 which provides the power needed for lamps as well as light modulator actuation. The drivers 152 153, 154, and/or 168 may also include or be associated with DC-DC converters for transforming an input voltage at 182 into various voltages sufficient for the actuation of shutters 108 or illumination of the lamps, such as lamps 162, 164, 166, and 167.

Figure 2:
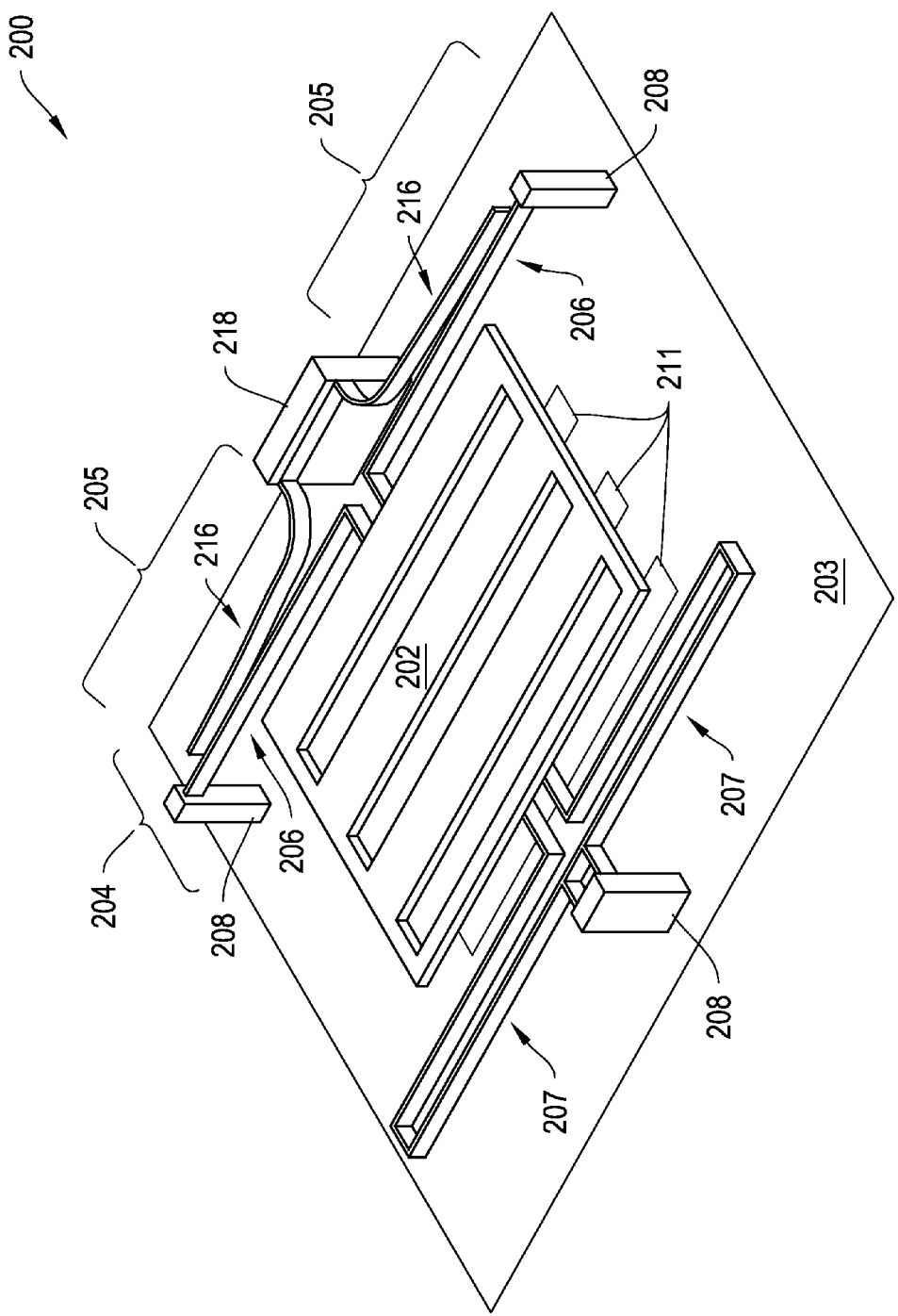
FIG. 2 is an example of an illustrative shutter-based light modulator suitable for incorporation into the MEMS-based display of FIG. 1A, according to an illustrative implementation.

FIG. 2 is a perspective view of an illustrative shutter-based light modulator 200 suitable for incorporation into the MEMS-based display apparatus 100 of FIG. 1A, according to an illustrative implementation. The shutter-based light modulator 200 (also referred to as shutter assembly 200) includes a shutter 202 coupled to an actuator 204. The actuator 204 is formed from two separate compliant electrode beam actuators 205 (the "actuators 205"), as described in U.S. Pat. No. 7,271,945. The shutter 202 couples on one side to the actuators 205. The actuators 205 move the shutter 202 transversely over a surface 203 in a plane of motion which is parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The load anchors 208 physically connect the compliant load beams 206 and the shutter 202 to the surface 203 and electrically connect the load beams 206 to a bias voltage, in some instances, ground. Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

The surface 203 includes one or more apertures 211 for admitting the passage of light. If the shutter assembly 200 is formed on an opaque substrate, made for example from silicon, then the surface 203 is a surface of the substrate, and the apertures 211 are formed by etching an array of holes through the substrate. If the shutter assembly 200 is formed on a transparent substrate, made for example of glass or plastic, then the surface 203 is a surface of a light blocking layer deposited on the substrate, and the apertures are formed by etching the surface 203 into an array of holes 211. The apertures 211 can be generally circular, elliptical, polygonal, serpentine, or irregular in shape.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely towards the drive anchor 218. The compliant members 206 act as springs, such that when the voltage across the beams 206 and 216 is removed, the load beams 206 push the shutter 202 back into its initial position, releasing the stress stored in the load beams 206.

The shutter assembly 200, also referred to as an elastic shutter assembly, incorporates a passive restoring force, such as a spring, for returning a shutter to its rest or relaxed position after voltages have been removed. A number of elastic restore mechanisms and various electrostatic couplings can be designed into or in conjunction with electrostatic actuators, the compliant beams illustrated in shutter assembly 200 being just one example. Other examples are described in U.S. Pat. No. 7,271,945 and U.S. patent application Ser. No. 11/326, 696, incorporated herein by reference. For instance, a highly non-linear voltage-displacement response can be provided which favors an abrupt transition between "open" vs "closed" states of operation, and which, in many cases, provides a bi-stable or hysteretic operating characteristic for the shutter assembly. Other electrostatic actuators can be designed with more incremental voltage-displacement responses and with considerably reduced hysteresis, for example in analog gray scale operation.

The actuator 205 within the elastic shutter assembly is said to operate between a closed or actuated position and a relaxed position. The designer, however, can choose to place apertures 211 such that shutter assembly 200 is in either the "open" state, i.e. passing light, or in the "closed" state, i.e. blocking light, whenever actuator 205 is in its relaxed position.

In some implementations, the shutter assembly includes a dual set of "open" and "closed" actuators so that the control electronics are capable of electrostatically driving the shutters into each of the open and closed states.

U.S. Pat. No. 7,271,945 and U.S. patent application Ser. No. 11/326,696 have described a variety of methods by which an array of shutters can be controlled via a control matrix to produce images, in many cases moving images, with appropriate gray scale. In some cases, control is accomplished by means of a passive matrix array of row and column interconnects connected to driver circuits on the periphery of the display. In other cases it is appropriate to include switching and/or data storage elements within each pixel of the array (the so-called active matrix) to improve either the speed, the gray scale and/or the power dissipation performance of the display.

Figure 3:
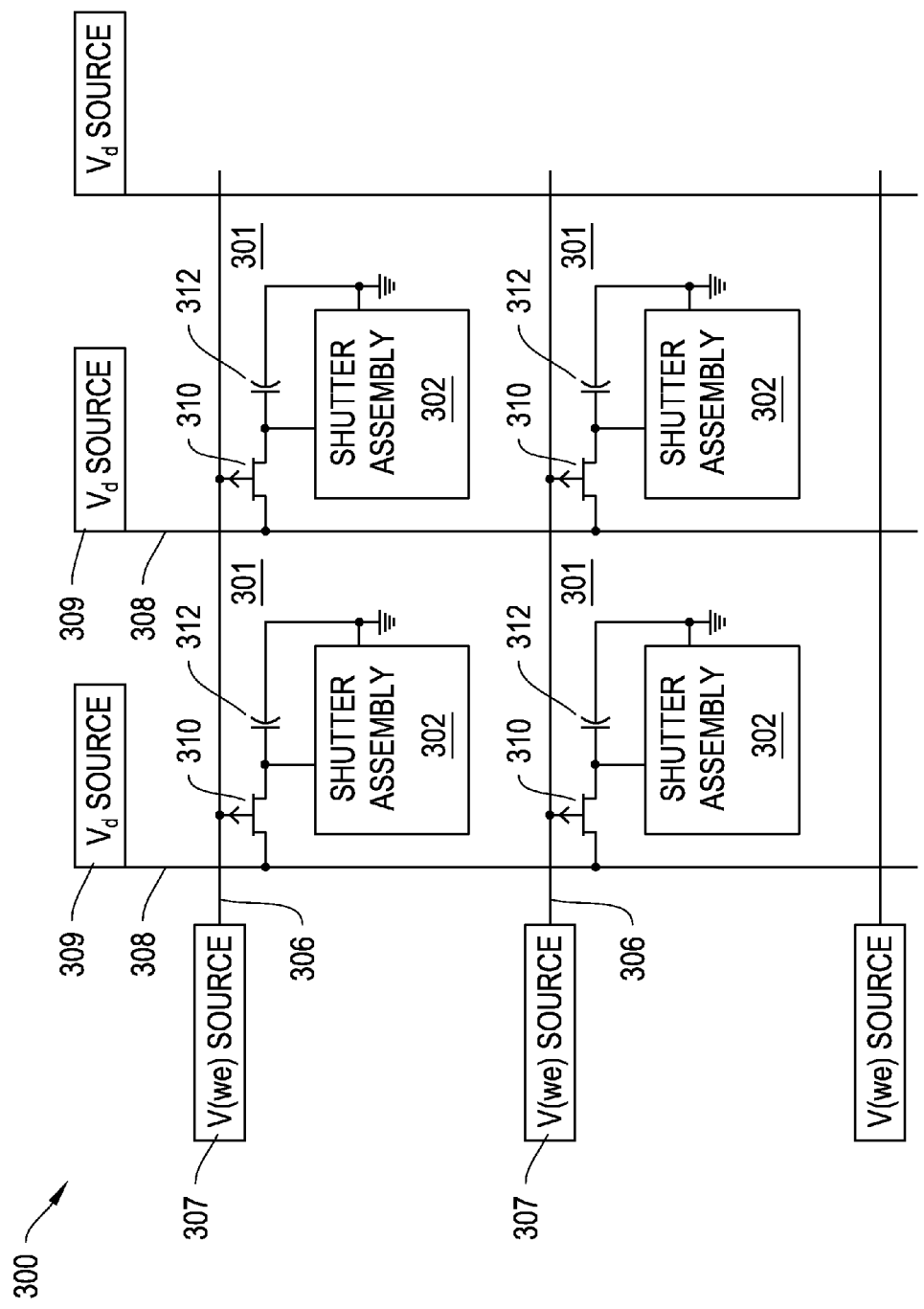
FIG. 3 is a schematic diagram of a control matrix suitable for controlling the light modulators incorporated into the MEMS-based display of FIG. 1A, according to an illustrative implementation.
Figure 4:
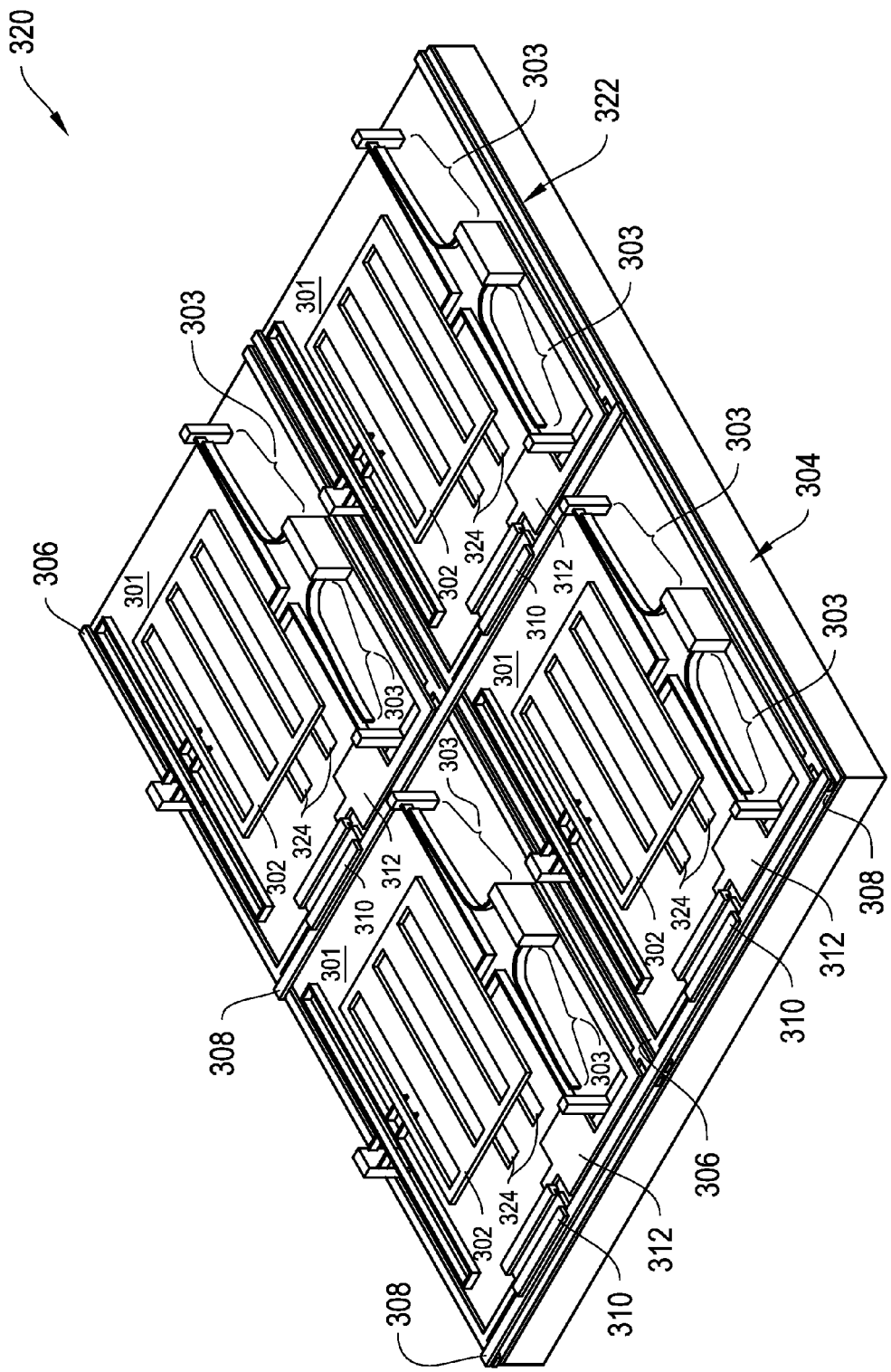
FIG. 4 is an example of an array of shutter-based light modulators connected to the control matrix of FIG. 3, according to an illustrative implementation.

FIG. 3 is a schematic diagram of a control matrix 300 suitable for controlling the light modulators incorporated into the MEMS-based display apparatus 100 of FIG. 1A, according to an illustrative implementation. FIG. 4 is an example of an array 320 of shutter-based light modulators connected to the control matrix 300 of FIG. 3, according to an illustrative implementation. The control matrix 300 may address an array of pixels 320 (the "array 320"). Each pixel 301 includes an elastic shutter assembly 302, such as the shutter assembly 200 of FIG. 2, controlled by an actuator 303. Each pixel also includes an aperture layer 322 that includes apertures 324. Further electrical and mechanical descriptions of shutter assemblies such as shutter assembly 302, and variations thereon, can be found in U.S. Pat. No. 7,271,945 and U.S. patent application Ser. No. 11/326,696. Descriptions of alternate control matrices can also be found below in relation to FIGS. 10 and 11, as well as in U.S. patent application Ser. No. 11/607,715.

The control matrix 300 is fabricated as a diffused or thin-film-deposited electrical circuit on the surface of a substrate 304 on which the shutter assemblies 302 are formed. The control matrix 300 includes a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307 to the pixels 301 in a corresponding row of pixels 301. Each data interconnect 308 electrically connects a data voltage source, ("Vd source") 309 to the pixels 301 in a corresponding column of pixels 301. In control matrix 300, the data voltage $V_d$ provides the majority of the actuation energy for the shutter assemblies 302. Thus, the data voltage source 309 also serves as an actuation voltage source.

Referring to FIGS. 3 and 4, for each pixel 301 or for each shutter assembly 302 in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly 302 include two electrodes. The drain of each transistor 310 is electrically connected in parallel to one electrode of the corresponding capacitor 312 and to one of the electrodes of the corresponding actuator 303. The other electrode of the capacitor 312 and the other electrode of the actuator 303 in shutter assembly 302 are connected to a common or ground potential. In alternate implementations, the transistors 310 can be replaced with semiconductor diodes and or metal-insulator-metal sandwich type switching elements.

In operation, to form an image, the control matrix 300 write-enables each row in the array 320 in a sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors 310 to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly 302 actuates, opening the shutter in that shutter assembly 302. The voltage applied to the data interconnect 308 remains stored in the capacitor 312 of the pixel 301 even after the control matrix 300 ceases to apply $V_{we}$ to a row. It is not needed, therefore, to wait and hold the voltage $V_{we}$ on a row for times long enough for the shutter assembly 302 to actuate; such actuation can proceed after the write-enabling voltage has been removed from the row. The capacitors 312 also function as memory elements within the array 320, storing actuation instructions for periods as long as is necessary for the illumination of an image frame.

The pixels 301 as well as the control matrix 300 of the array 320 are formed on a substrate 304. The array includes an aperture layer 322, disposed on the substrate 304, which includes a set of apertures 324 for respective pixels 301 in the array 320. The apertures 324 are aligned with the shutter assemblies 302 in each pixel. In one implementation the substrate 304 is made of a transparent material, such as glass or plastic. In another implementation the substrate 304 is made of an opaque material, but in which holes are etched to form the apertures 324.

Components of shutter assemblies 302 are processed either at the same time as the control matrix 300 or in subsequent processing steps on the same substrate. The electrical components in control matrix 300 are fabricated using many thin film techniques in common with the manufacture of thin film transistor arrays for liquid crystal displays. Available techniques are described in Den Boer, Active Matrix Liquid Crystal Displays (Elsevier, Amsterdam, 2005), incorporated herein by reference. The shutter assemblies are fabricated using techniques similar to the art of micromachining or from the manufacture of micromechanical (i.e., MEMS) devices. Many applicable thin film MEMS techniques are described in Rai-Choudhury, ed., Handbook of Microlithography, Micromachining & Microfabrication (SPIE Optical Engineering Press, Bellingham, Wash. 1997), incorporated herein by reference. Fabrication techniques specific to MEMS light modulators formed on glass substrates can be found in U.S. Pat. Nos. 7,405,852 and 7,675,665, incorporated herein by reference. For instance, as described in those applications, the shutter assembly 302 can be formed from thin films of amorphous silicon, deposited by a chemical vapor deposition process.

The shutter assembly 302 together with the actuator 303 can be made bi-stable. That is, the shutters can exist in at least two equilibrium positions (e.g. open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with the actuator 303 can also be made electrically bi-stable. In an electrically bi-stable shutter assembly, there exists a range of voltages below the actuation voltage of the shutter assembly, which if applied to a closed actuator (with the shutter being either open or closed), holds the actuator closed and the shutter in position, even if an opposing force is exerted on the shutter. The opposing force may be exerted by a spring such as spring 207 in shutter-based light modulator 200, or the opposing force may be exerted by an opposing actuator, such as an "open" or "closed" actuator.

The light modulator array 320 is depicted as having a single MEMS light modulator per pixel. Other implementations are possible in which multiple MEMS light modulators are provided in each pixel, thereby providing the possibility of more than just binary "on" or "off" optical states in each pixel. Certain forms of coded area division gray scale are possible where multiple MEMS light modulators in the pixel are provided, and where apertures 324, which are associated with each of the light modulators, have unequal areas.

Figure 5A:
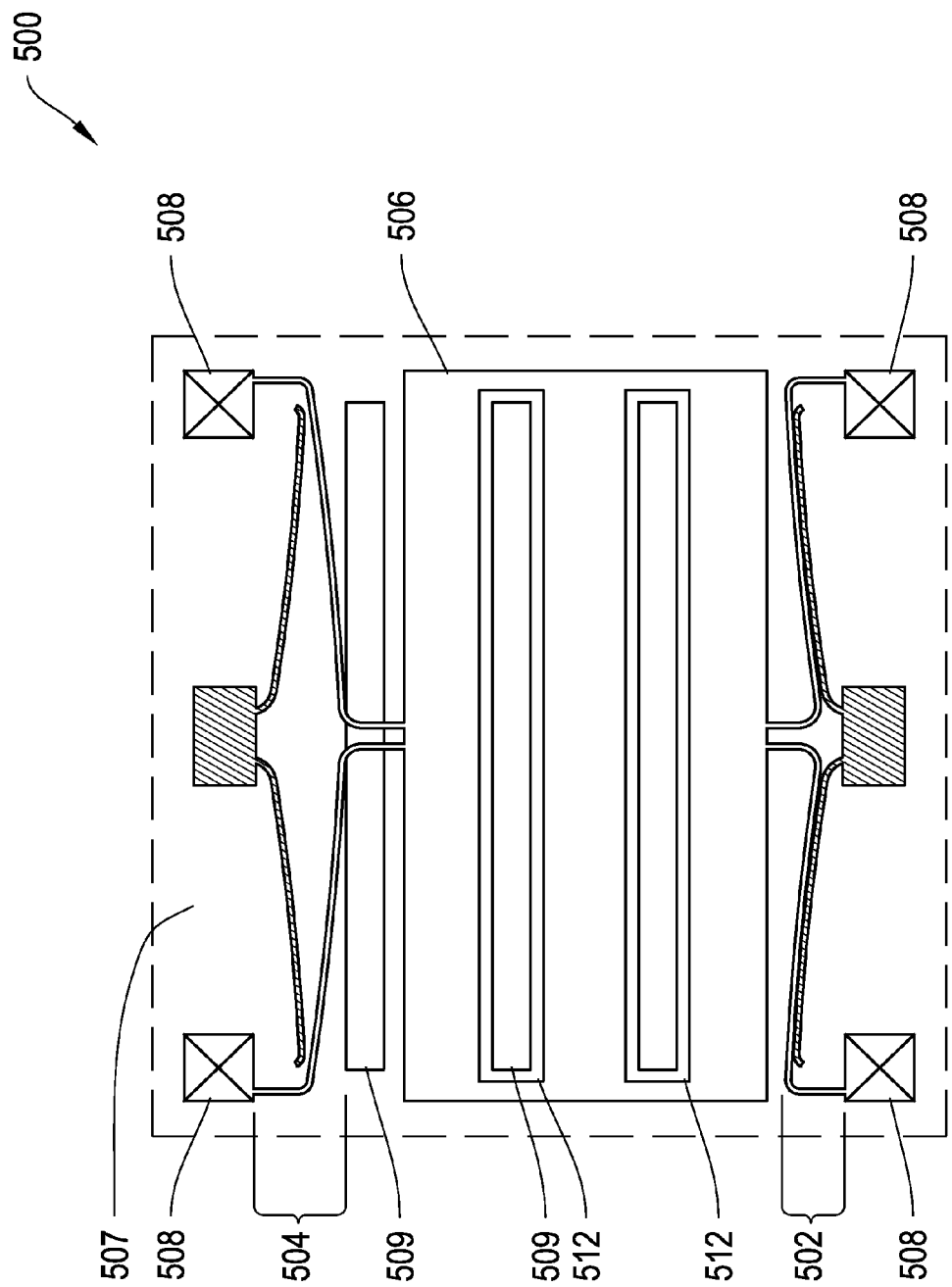
FIG. 5A is an example of a first dual-actuator shutter-based light modulator, according to an illustrative implementation.
Figure 5B:
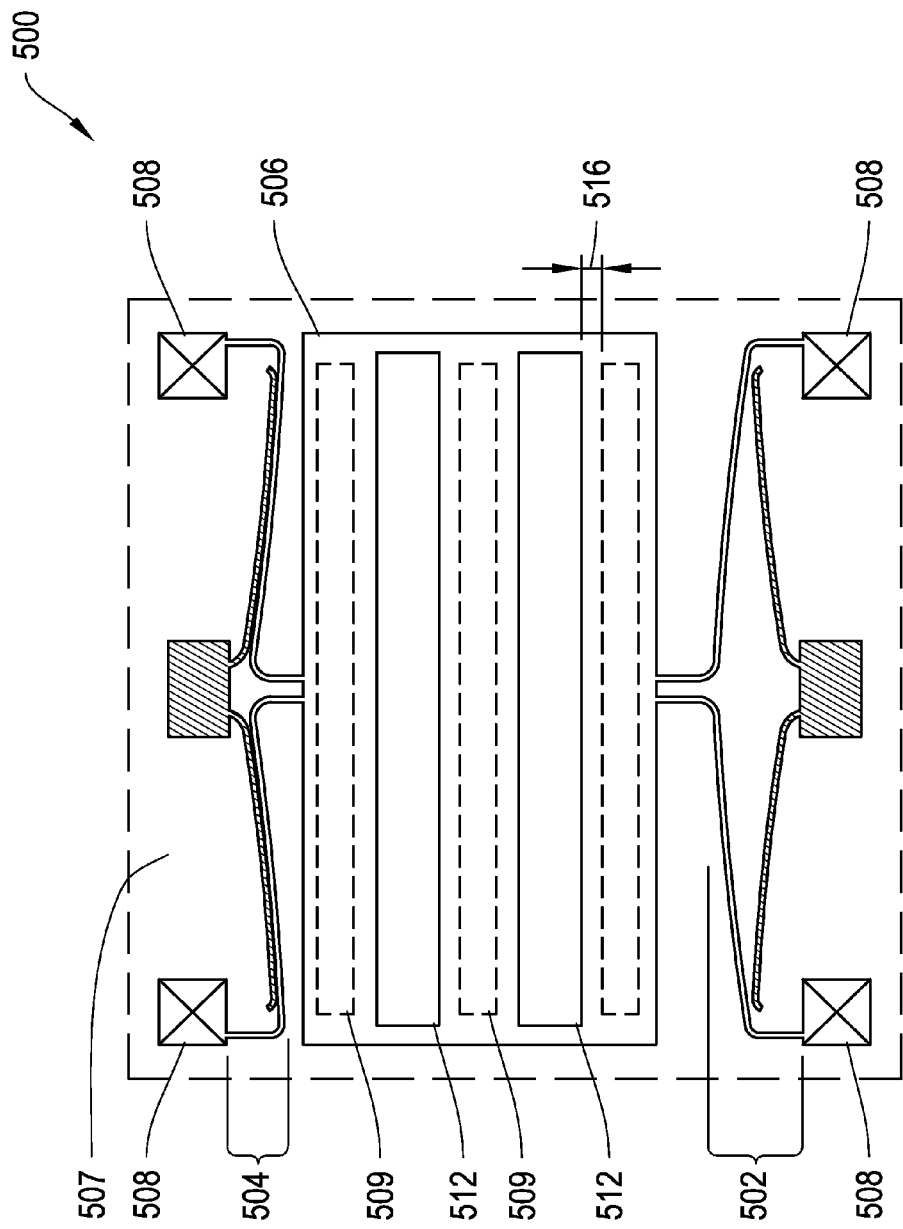
FIG. 5B is an example of a second dual-actuator shutter-based light modulator, according to an illustrative implementation.

FIGS. 5A and 5B illustrate examples of dual actuator shutter-based light modulators 500, according to an illustrative implementation. The light modulator 500 is shown in FIG. 5A in an open state. FIG. 5B is a view of the dual actuator shutter assembly 500 in a closed state. Shutter assembly 500 includes actuators 502 and 504 on either side of a shutter 506. Each actuator 502 and 504 is independently controlled. A first actuator, a shutter-open actuator 502, serves to open the shutter 506. A second opposing actuator, the shutter-close actuator 504, serves to close the shutter 506. Both actuators 502 and 504 are compliant beam electrode actuators. The actuators 502 and 504 open and close the shutter 506 by driving the shutter 506 in a plane parallel to an aperture layer 507 over which the shutter is suspended. The shutter 506 is suspended a short distance over the aperture layer 507 by anchors 508 attached to the actuators 502 and 504. The inclusion of supports attached to both ends of the shutter 506 along its axis of movement reduces out of plane motion of the shutter 506 and confines the motion to a plane parallel to the substrate. Shutter assemblies, such as shutter assembly 500 are often fabricated on the same substrate as the control matrix.

The shutter 506 includes two shutter apertures 512 through which light can pass. The aperture layer 507 includes a set of three apertures 509. In FIG. 5A, the shutter assembly 500 is in the open state and, as such, the shutter-open actuator 502 has been actuated, the shutter-close actuator 504 is in its relaxed position, and the centerlines of apertures 512 and 509 coincide. In FIG. 5B the shutter assembly 500 has been moved to the closed state and, as such, the shutter-open actuator 502 is in its relaxed position, the shutter-close actuator 504 has been actuated, and the light blocking portions of shutter 506 are now in position to block transmission of light through the apertures 509 (shown as dotted lines).

Each aperture has at least one edge around its periphery. For example, the rectangular apertures 509 have four edges. In alternative implementations in which circular, elliptical, oval, or other curved apertures are formed in the aperture layer 507, each aperture may have only a single edge. In other implementations the apertures need not be separated or disjoint in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 512 and 509 in the open state, it is advantageous to provide a width or size for shutter apertures 512 which is larger than a corresponding width or size of apertures 509 in the aperture layer 507. In order to effectively block light from escaping in the closed state, the light blocking portions of the shutter 506 overlap the apertures 509. FIG. 1B shows a predefined overlap 516 between the edge of light blocking portions in the shutter 506 and one edge of the aperture 509 formed in aperture layer 507.

The electrostatic actuators 502 and 504 are designed so that their voltage-displacement behavior provides a bi-stable characteristic to the shutter assembly 500. For each of the shutter-open and shutter-close actuators there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$. A number of control matrices which take advantage of the bi-stable operation characteristic are described in U.S. patent application Ser. No. 11/607,715, referenced above.

Figure 6:
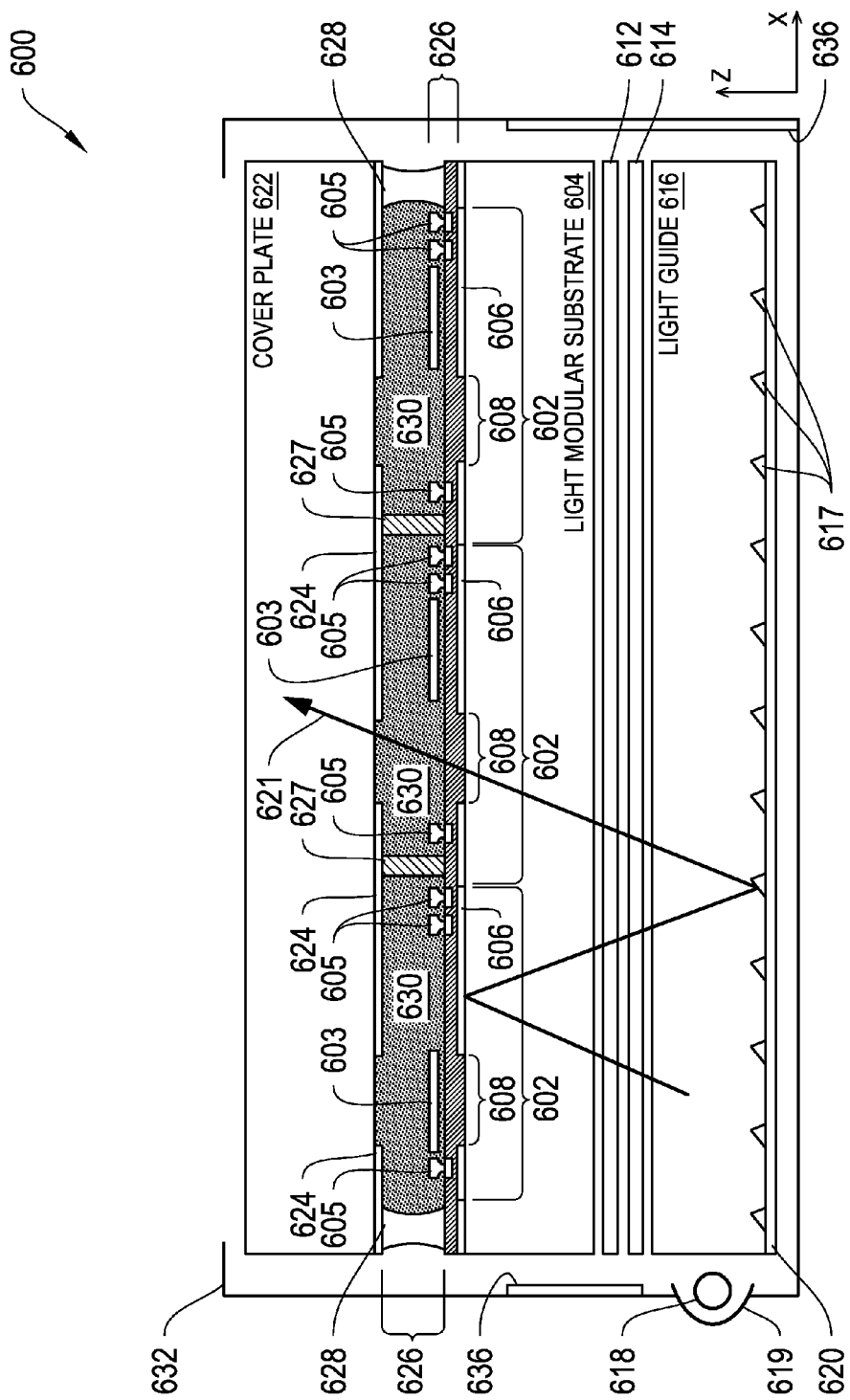
FIG. 6 is a cross sectional view of a display apparatus incorporating shutter-based light modulators, according to an illustrative implementation.

FIG. 6 is a cross sectional view of a display apparatus 600 incorporating shutter-based light modulators (shutter assemblies) 602, according to one illustrative implementation. Each shutter assembly incorporates a shutter 603 and an anchor 605. Not shown are the compliant beam actuators which, when connected between the anchors 605 and the shutters 603, help to suspend the shutters a short distance above the surface. The shutter assemblies 602 are disposed on a transparent substrate 604, made of plastic or glass in some implementations. A rear-facing reflective layer, reflective film 606, disposed on the substrate 604 defines a plurality of surface apertures 608 located beneath the closed positions of the shutters 603 of the shutter assemblies 602. The reflective film 606 reflects light not passing through the surface apertures 608 back towards the rear of the display apparatus 600. The reflective aperture layer 606 can be a fine-grained metal film without inclusions formed in thin film fashion by a number of vapor deposition techniques including sputtering, evaporation, ion plating, laser ablation, or chemical vapor deposition. In another implementation, the rear-facing reflective layer 606 can be formed from a mirror, such as a dielectric mirror. A dielectric mirror is fabricated as a stack of dielectric thin films which alternate between materials of high and low refractive index. The vertical gap which separates the shutters 603 from the reflective film 606, within which the shutter is free to move, is in the range of 0.5 to 10 microns. In some implementations, the magnitude of the vertical gap is less than the lateral overlap between the edge of shutters 603 and the edge of apertures 608 in the closed state, such as the overlap 616 shown in FIG. 5B.

The display apparatus 600 includes an optional diffuser 612 and/or an optional brightness enhancing film 614 which separate the substrate 604 from a planar light guide 616. The light guide includes a transparent, i.e. glass or plastic material. The light guide 616 is illuminated by one or more light sources 618, forming a backlight. The light sources 618 can be, for example, and without limitation, incandescent lamps, fluorescent lamps, lasers, or light emitting diodes (LEDs). A reflector 619 helps direct light from lamp 618 towards the light guide 616. A front-facing reflective film 620 is disposed behind the backlight 616, reflecting light towards the shutter assemblies 602. Light rays such as ray 621 from the backlight that do not pass through one of the shutter assemblies 602 will be returned to the backlight and reflected again from the film 620. In this fashion light that fails to leave the display to form an image on the first pass can be recycled and made available for transmission through other open apertures in the array of shutter assemblies 602. Such light recycling has been shown to increase the illumination efficiency of the display.

The light guide 616 includes a set of geometric light redirectors or prisms 617 which re-direct light from the lamps 618 towards the apertures 608 and hence toward the front of the display. The light re-directors can be molded into the plastic body of light guide 616 with shapes that can be alternately triangular, trapezoidal, or curved in cross section. The density of the prisms 617 generally increases with distance from the lamp 618.

In alternate implementations the aperture layer 606 can be made of a light absorbing material, and in alternate implementations the surfaces of shutter 603 can be coated with either a light absorbing or a light reflecting material. In alternate implementations the aperture layer 606 can be deposited directly on the surface of the light guide 616. In alternate implementations the aperture layer 606 need not be disposed on the same substrate as the shutters 603 and anchors 605 (see the MEMS-down configuration described below). These and other implementations for a display illumination system are described in detail in the U.S. Pat. No. 7,417,782 and U.S. Pat. No. 7,876,489, incorporated herein by reference.

In one implementation the light sources 618 can include lamps of different colors, for instance, the colors red, green, and blue. A color image can be formed by sequentially illuminating images with lamps of different colors at a rate sufficient for the human brain to average the different colored images into a single multi-color image. The various color-specific images are formed using the array of shutter assemblies 602. In another implementation, the light source 618 includes lamps having more than three different colors. For example, the light source 618 may have red, green, blue and white lamps or red, green, blue, and yellow lamps.

A cover plate 622 forms the front of the display apparatus 600. The rear side of the cover plate 622 can be covered with a black matrix 624 to increase contrast. In alternate implementations the cover plate includes color filters, for instance distinct red, green, and blue filters corresponding to different ones of the shutter assemblies 602. The cover plate 622 is supported a predetermined distance away from the shutter assemblies 602 forming a gap 626. The gap 626 is maintained by mechanical supports or spacers 627 and/or by an adhesive seal 628 attaching the cover plate 622 to the substrate 604.

The adhesive seal 628 seals in a working fluid 630. The working fluid 630 is engineered with viscosities below about 10 centipoise and with relative dielectric constant above about 2.0, and dielectric breakdown strengths above about $10^4$ V/cm. The working fluid 630 can also serve as a lubricant. In one implementation, the working fluid 630 is a hydrophobic liquid with a high surface wetting capability. In alternate implementations the working fluid 630 has a refractive index that is either greater than or less than that of the substrate 604.

A sheet metal or molded plastic assembly bracket 632 holds the cover plate 622, the substrate 604, the backlight 616 and the other component parts together around the edges. The assembly bracket 632 is fastened with screws or indent tabs to add rigidity to the combined display apparatus 600. In some implementations, the light source 618 is molded in place by an epoxy potting compound. Reflectors 636 help return light escaping from the edges of light guide 616 back into the light guide. Not shown in FIG. 2 are electrical interconnects which provide control signals as well as power to the shutter assemblies 602 and the lamps 618.

Further details and alternate configurations for the display apparatus 600, including manufacturing methods therefore, can be found in U.S. Pat. Nos. 7,417,782 and 7,876,489, incorporated herein by reference.

Display apparatus 600 is referred to as the MEMS-up configuration, with the MEMS based light modulators are formed on a front surface of substrate 604, i.e. the surface that faces toward the viewer. The shutter assemblies 602 are built directly on top of the reflective aperture layer 606. In an alternate implementation, referred to as the MEMS-down configuration, the shutter assemblies are disposed on a substrate separate from the substrate on which the reflective aperture layer is formed. The substrate on which the reflective aperture layer is formed, defining a plurality of apertures, is referred to herein as the aperture plate. In the MEMS-down configuration, the substrate that carries the MEMS-based light modulators takes the place of the cover plate 622 in display apparatus 600 and is oriented such that the MEMS-based light modulators are positioned on the rear surface of the top substrate, i.e. the surface that faces away from the viewer and toward the back light 616. The MEMS-based light modulators are thereby positioned directly opposite to and across a gap from the reflective aperture layer. The gap can be maintained by a series of spacer posts connecting the aperture plate and the substrate on which the MEMS modulators are formed. In some implementations the spacers are disposed within or between each pixel in the array. In some implementations, the gap or distance that separates the MEMS light modulators from their corresponding apertures is less than 10 microns, or a distance that is less than the overlap between shutters and apertures, such as overlap 516. Further details and alternate implementations for the MEMS-down display configuration can be found in the U.S. Pat. Nos. 7,405,852 and 7,675,665 referenced above.

A display built from an array of mechanical light modulators can include many tens of thousands of light modulators, at least one for each pixel of the display, and can include up to many millions of light modulators. The motion of each light modulator is controlled by the commands directed through the control matrix, sometimes referred to as the backplane circuit. For video operation, the operational state of the individual light modulators can be changed from 50 times per second up to 50,000 times per second. As a consequence, with many thousands of shutter assemblies moving over time scales characteristic of audible frequencies, the displays are capable of emitting undesirable acoustic noise as a byproduct. When a display apparatus includes a working fluid, such as working fluid 630, the fluid can couple the motion of neighboring light modulators to each other, and/or couple the motion of an array of light modulators to a cover plate, such as cover plate 622. The cover plate, if it is driven by a moving fluid at acoustic frequencies, can act as a transducer for broadcasting audible noise to the environment.

Individual pixels in a display assembly are often only tens of microns to hundreds of microns in size, while commonplace images in a display can have regions of uniform color or contrast which can measure millimeters or even centimeters. It is therefore a common occurrence that many tens or many hundreds of light modulators in a neighboring region of a display are caused to move by signals from the control matrix with similar motions and with similar timing signals. This synchronization or correlation of the movements of neighboring pixels contributes to the amplitude of the acoustic emissions.

Designs for the array of light modulators are therefore sought which can reduce correlations in the movement of neighboring pixels, and thereby reduce the amplitude of acoustic emissions. Several examples of such designs are described below.

Figure 7A:
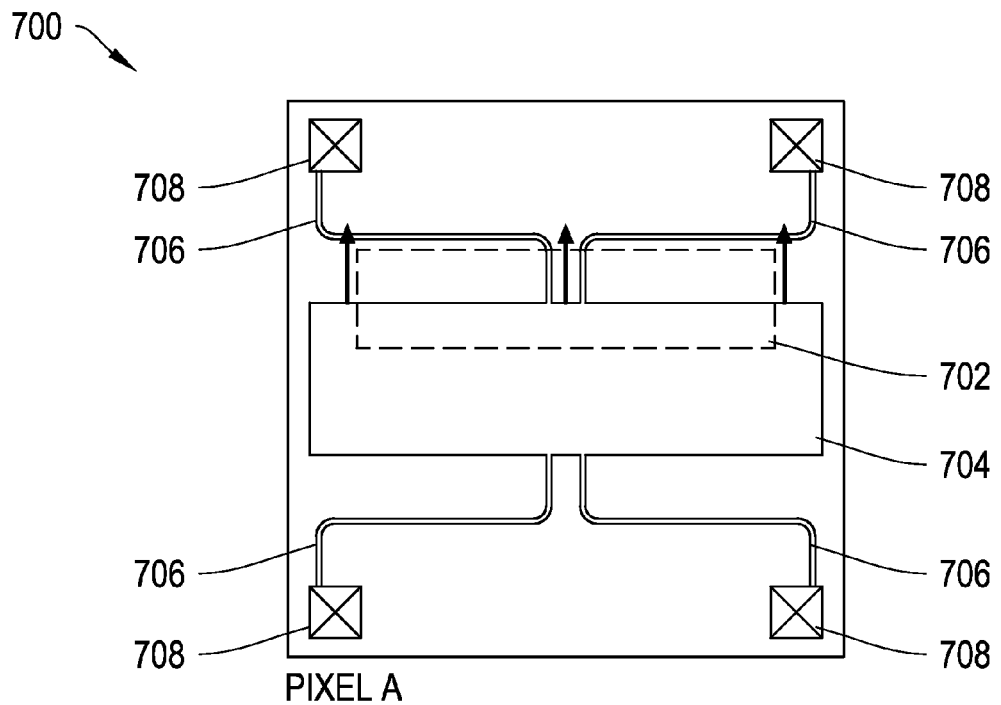
FIG. 7A illustrates an example of a light modulator with a first possible spatial relationship between a shutter and an aperture, according to an illustrative implementation.

FIG. 7A illustrates an example of a light modulator 700 with a first spatial relationship between a shutter 704 and an aperture 702, according to an illustrative implementation. The light modulator 700 in FIG. 7A is in an inactive state, neither completely allowing the passage of light through the aperture 702 nor completely blocking the passage of light. FIG. 7A shows the shutter 704 in a vertical orientation with respect to the aperture 702. In FIG. 7A, the shutter 704 moves up in order to reach the first active state, i.e., the closed state, where the shutter 704 completely obstructs light passing through the aperture. The shutter 704 can also be moved towards a second active state, i.e., the open state, by movement in the opposite direction, or in the down direction. When moved down and into the open position with respect to the aperture 702, the shutter 704 in the second active state will allow light to pass through the aperture 702.

Figure 7B:
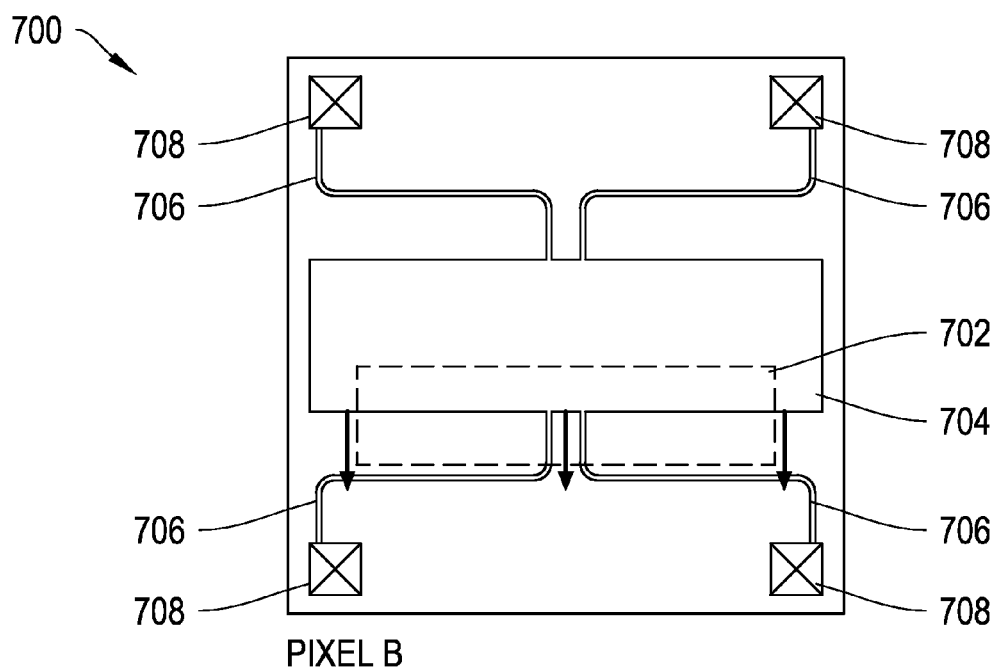
FIG. 7B illustrates an example of a light modulator with a second possible spatial relationship between a shutter and an aperture, according to an illustrative implementation.
Figure 7C:
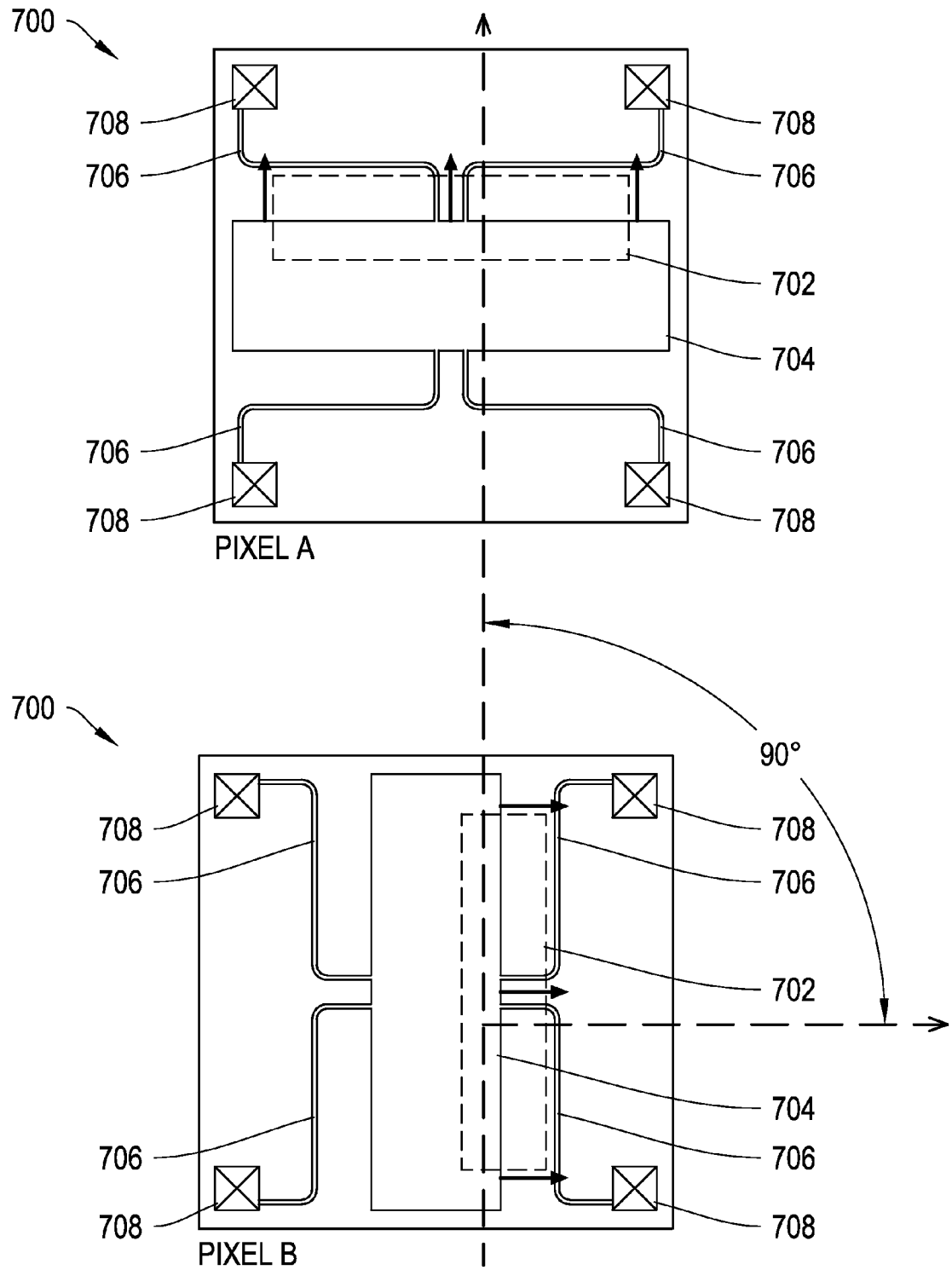
FIG. 7C illustrates an example of a first MEMS light modulator, associated with Pixel A, capable of being driven from a light-blocking state to a light-transmissive state through movement in a first direction and a second MEMS light modulator, associated with Pixel B, capable of being driven from a light-blocking state to a light-transmissive state through movement in a second direction where the second direction is oriented by about 90 degrees relative to the first direction.
Figure 7D:
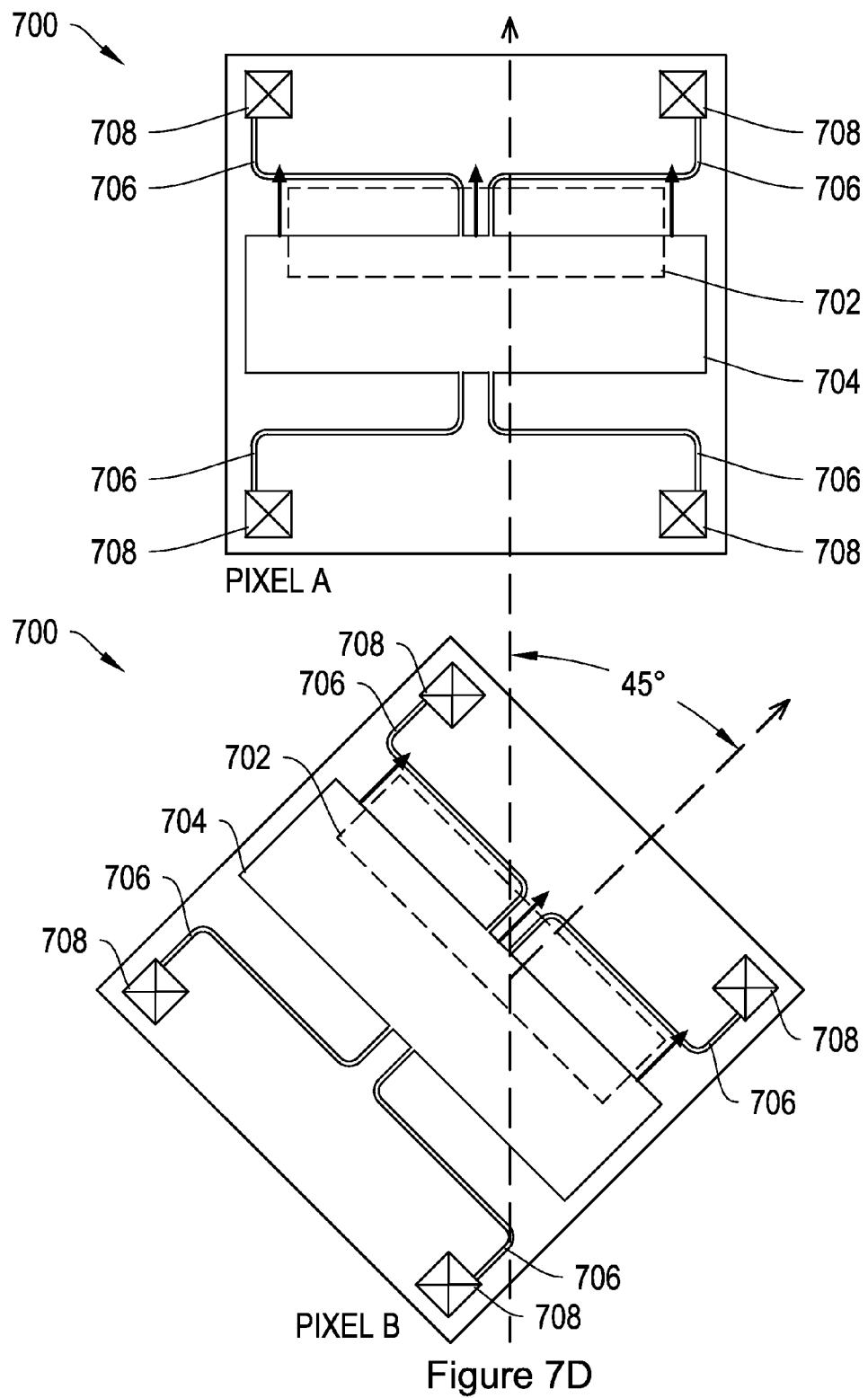
FIG. 7D illustrates an example of a first MEMS light modulator, associated with Pixel A, capable of being driven from a light-blocking state to a light-transmissive state through movement in a first direction and a second MEMS light modulator, associated with Pixel B, capable of being driven from a light-blocking state to a light-transmissive state through movement in a second direction where the second direction is oriented by about 45 degrees relative to the first direction.
Figure 7E:
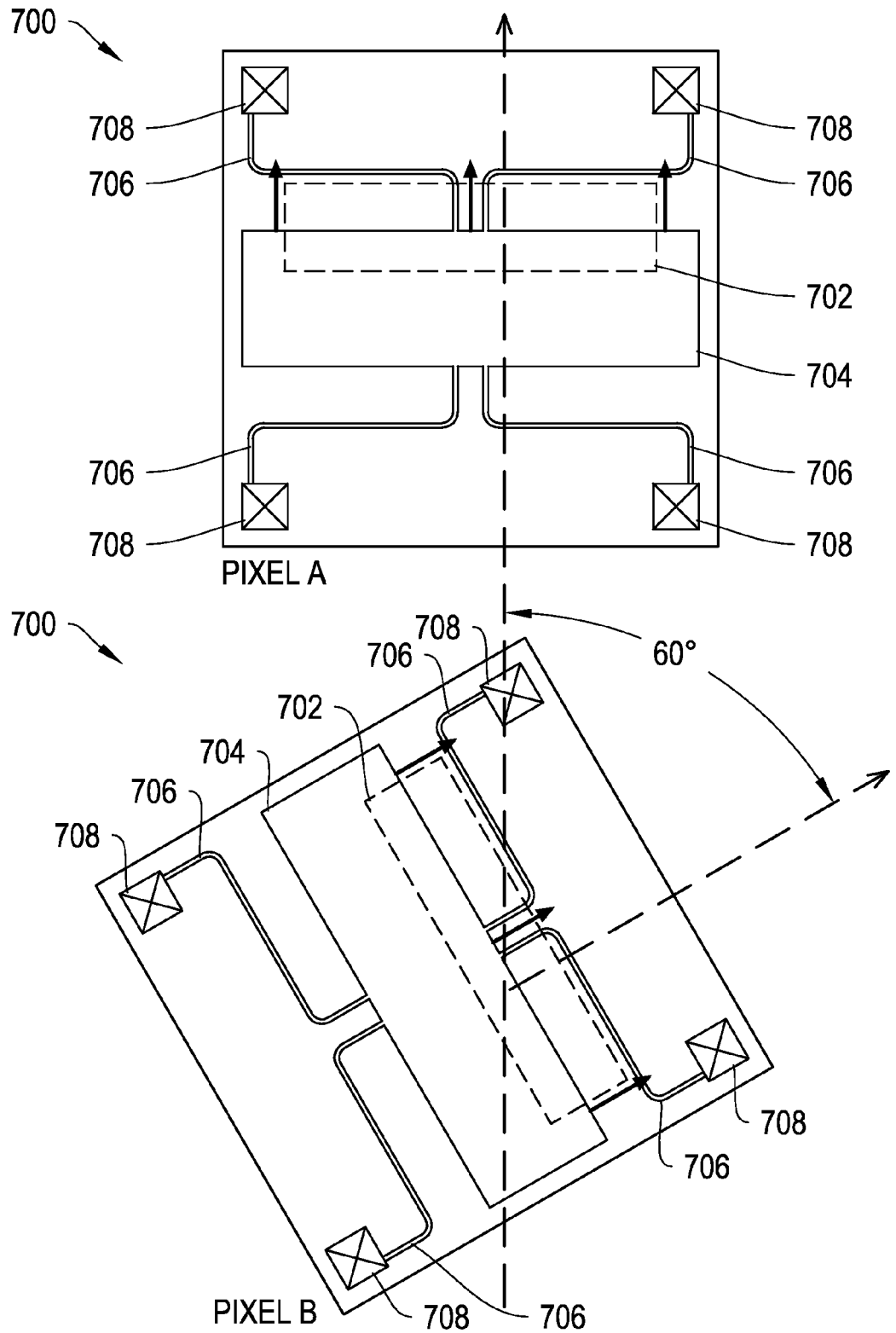
FIG. 7E illustrates an example of a first MEMS light modulator, associated with Pixel A, capable of being driven from a light-blocking state to a light-transmissive state through movement in a first direction and a second MEMS light modulator, associated with Pixel B, capable of being driven from a light-blocking state to a light-transmissive state through movement in a second direction where the second direction is oriented by about 60 degrees relative to the first direction.

FIG. 7B illustrates an example of a light modulator 700 with a second spatial relationship between a shutter and an aperture, according to an illustrative implementation. The light modulator 700 in FIG. 7B is in an inactive state, neither completely allowing the passage of light through the aperture 702 nor completely blocking the passage of light. FIG. 7B shows the shutter 704 in a vertical orientation with respect to the aperture 702. In FIG. 7B, the shutter 704 moves down in order to reach the first active state, i.e., the closed state, where the shutter 704 completely obstructs light passing through the aperture. The shutter 704 can also be moved towards a second active state, i.e. the open state, by movement in the opposite direction in the up direction. When moved up and into the open position with respect to the aperture 702, the shutter 704 in the second active state allows light to pass through the aperture 702.

One can appreciate that the FIGS. 7A and 7B could have just as easily been drawn in a horizontal orientation, such that for instance the first possible spatial relationship between shutter and aperture can be one in which the shutter moves to the left to move from the inactive state towards the first active state, i.e., the closed state. Conversely, the second spatial relationship between shutter and aperture can be one in which the shutter moves to the right to move from the inactive state towards the first active state, i.e., the closed state.

If the spatial relationships of all the shutters and apertures in a large array are the same, the array can create some significant pressure waves when all the shutters are switching to the same active state. These pressure waves, amplified by the working fluid, translate into noise emitted from the display. This problem is greatest for solid or nearly solid color patterns, where many tens of thousands of light modulators can all be caused to move in the same direction at the same time, and at frequencies of 500 Hz or more.

To alleviate this issue, array of light modulators can be configured such that the spatial relationships between the light modulators and their corresponding apertures are not all the same. In such configurations, for a particular solid color pattern, the light modulators will not all move in the same direction. For example, an array of light modulators can include at least two groups of light modulators with the first group of light modulators is configured to be driven from a light-blocking state to a light-transmissive state through movement in a first direction, and the second group of light modulators is configured to be driven from a light-blocking state to a light-transmissive state through movement in a second direction. The second direction is substantially different from the first direction.

In some implementations the first and second directions of motion for the two groups of modulators will be in planar opposite directions. In other implementations the first and second directions might be oriented by about 90, 60, or 45 degrees from each other. In still other implementations, the motion from the inactive state to the first active state might be a circular motion, e.g. with the light modulators supported by cantilever beams. In this implementation a first group of light modulators are provided such the modulators are driven from the inactive state to the first active state in a clockwise direction, while light modulators in the second group are provided such that movement toward the first active state is in the counter-clockwise direction.

Figure 8A:
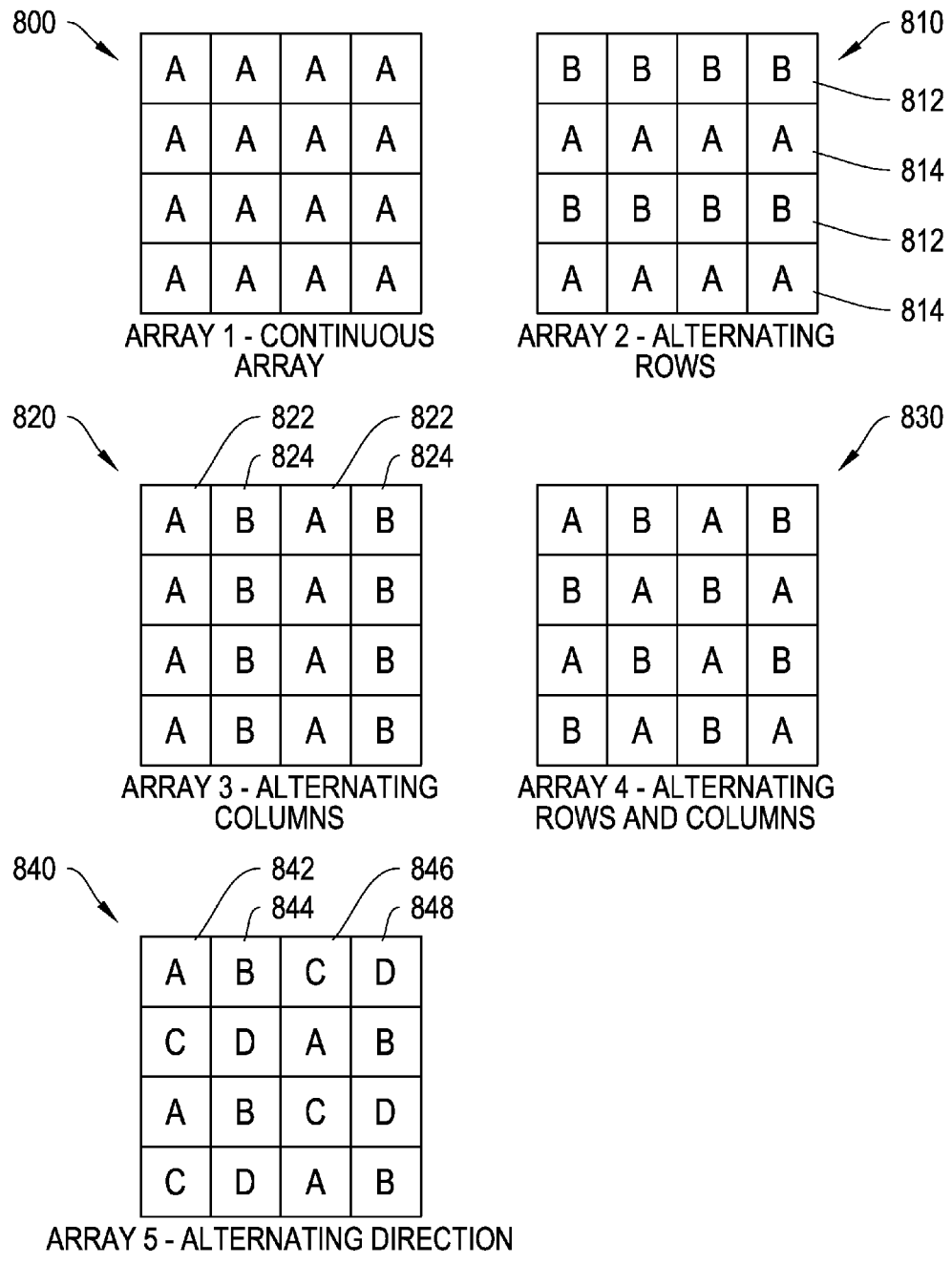
FIGS. 8A-8C depict examples of pixel grouping arrangements in a display.
Figure 8B:
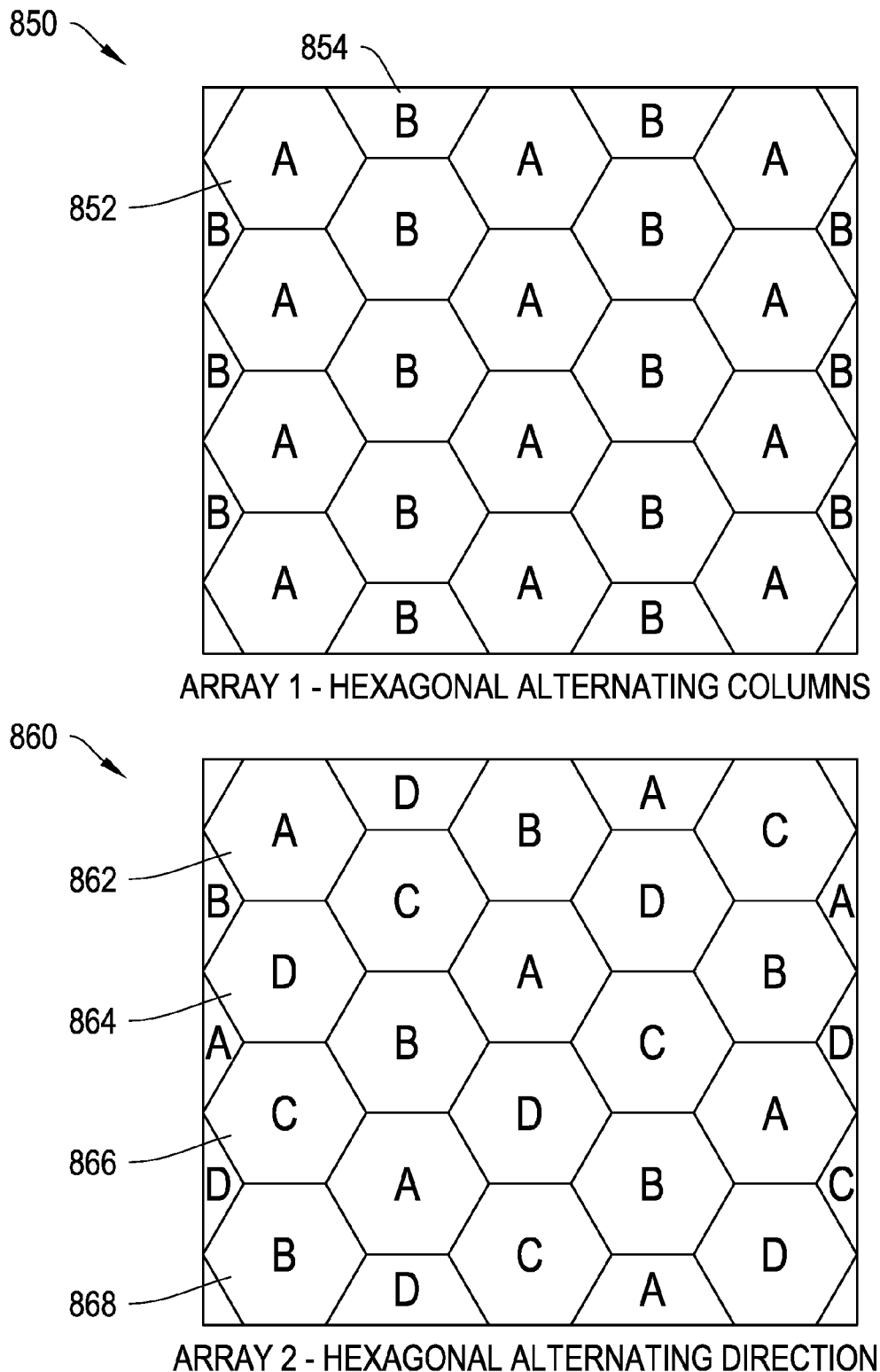
Figure 8C:
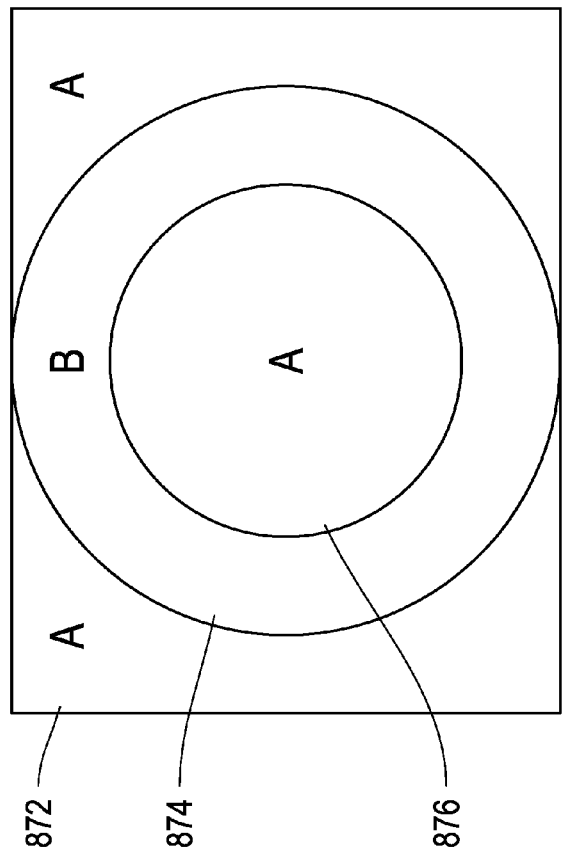

FIGS. 8A-C depict examples of pixel grouping arrangements in a display. The pixels are arranged so that the entire array does not have the same spatial relationship between shutter and aperture and the shutters do not move in the same direction to achieve the same active state. FIG. 8A depicts several generally rectangular pixel groups. FIG. 8B depicts generally hexagonal pixel groups. FIG. 8C depicts yet another suitable pixel grouping.

Array 800 of FIG. 8A is illustrative of the prior art, with each of the pixels in the array is arranged with the same spatial orientation, denoted by the symbol "A". Array 810 of FIG. 8A represents one illustrative implementation, with the light modulators of the array including two groups with distinct spatial relationships denoted by the symbols "A" and "B". The light modulators of group "A" move in a first direction to achieve the first active state, whereas the light modulators of group "B" move in a second direction to achieve the same first active state. The light modulators of groups "A" and "B" are arranged in alternating rows 812 and 814.

Array 820 of FIG. 8A represents another illustrative implementation, with the light modulators of the array including the same two groups with distinct spatial relationships denoted by the symbols "A" and "B". The light modulators of group "A" move in a first direction to achieve the first active state, whereas the light modulators of group "B" move in a second direction to achieve the same first active state. The light modulators of groups "A" and "B" are arranged in alternating columns 822 and 824.

The alternation of rows and columns can, but does not need to occur, on a single row by row or single column by single column basis. Alternatively, multiple rows or columns of pixels having the same orientation may be grouped side by side. In such configurations, to limit the noise, it is useful to keep the spatial period of alternation between the two groups of light modulators to less than about the thickness of the substrate. For example, a 127PPI display (which has a pixel pitch of 200 um) built upon 600 um thick glass, the alternation between groups is 3 pixel widths or less.

Array 830 of FIG. 8A represents another illustrative implementation, with the light modulators of the array including the same two groups with distinct spatial relationships denoted by the symbols "A" and "B". The light modulators of groups "A" and "B" are arranged such that they alternate every row and every column such that a member of group "A" is not adjacent to a member of group "B".

In an alternate implementation of the array 830, the groups "A" and "B" could be arranged in alternating clusters or in checkerboard-type clusters. There may be as few as 4 light modulators with the same spatial relationships within a cluster, e.g. in a 2 pixel by 2 pixel block, or as many as 36 or 100 similar light modulators within a cluster, e.g. in 6×6 or 10×10 pixel blocks.

In another implementation the light modulators from groups "A" and "B" can be arranged randomly throughout the array. As an additional benefit, if the light modulators from the groups "A" and "B" are dispersed randomly throughout the array, a number of visual artifacts related to misalignments between masking steps, or misalignment between the two substrates during module assembly can be reduced or eliminated.

Array 840 of FIG. 8A represents another illustrative implementation, with the light modulators of the array including of four groups of distinct spatial relationships denoted by the symbols "A," "B," "C," and "D." The light modulators of group "A" 842 move in a first direction to achieve the first active state. The light modulators of group "B" 844 move in a second direction to achieve the same first active state. The light modulators of group "C" 846 move in a third direction to achieve the same first active state, and the light modulators of group "D" 848 move in a fourth direction to achieve the same first active state. As an illustrative example, to achieve the same first active state, e.g., open, the light modulators in group "A" 842 move upwards, the light modulators in group "B" 844 move to the right, the light modulators in group "C" 846 move downwards, and the light modulators in group "D" 848 move to the left. In this example, groups "A" 842 and "C" 846 actuate in planar opposite directions, while groups "B"

844 and "D" 848 also actuate in planar opposite directions but in a substantially different direction than groups "A" 842 and "C" 846.

While FIG. 8A depicts several rectangular pixel grouping arrangements, the pixels can also be arranged into other geometric configurations. For example, FIG. 8B depicts two hexagonal groups of pixels. In the first configuration 850, the array includes two groups of modulators with distinct spatial orientations denoted by the symbols "A" and "B." Each group is formed from a hexagonal grouping of pixels, including, e.g., eight pixels with two in a first row, four in a second row, and two in a third row. The light modulators of group "A" move in a first direction to achieve the first active state, whereas the light modulators of group "B" move in a second direction to achieve the same first active state. Similar to array 820 of FIG. 8A, the light modulators of groups "A" and "B" are arranged into alternating columns 852 and 854.

Array 860 of FIG. 8B represents another illustrative implementation, with the hexagonal configuration of pixels divided into four groups of substantially different spatial orientations, denoted by the symbols "A" 862, "B" 868, "C" 866, and "D" 864. Similar to array 840 of FIG. 8A, the light modulators of the four groups move in four substantially different directions to achieve a first active state. As an illustrative example, to achieve the same active state, i.e., open, the light modulators in group "A" 862 move upwards to achieve a first active state, the light modulators in group "B" 868 move to the right, the light modulators in group "C" 866 move downwards, and the light modulators in group "D" 864 move to the left. The pixels in display area 860 are arranged such that groups "A" 862 and "C" 866 alternate within a diagonal row. Similarly, groups "B" 868 and "D" 864 also alternate within a diagonal row that is adjacent to the row with groups "A" 862 and "C" 866.

FIG. 8C represents another illustrative implementation, with the light modulators in display area 870 arranged into an outer region 872, an intermediate region 874, and an inner region 876. In this example, the light modulators in intermediate region 874, denoted by the symbol "B," move in a substantially different direction than the light modulators in the outer and inner regions 872 and 876, denoted by the symbol "A." One can appreciate that other arbitrary pixel regions may be defined in the display area to distribute modulators of-substantially different spatial orientations.

FIGS. 8A-C are presented merely as illustrative examples, and other combinations of spatial orientations and geometric configurations can be used other than the examples shown above to reduce correlations in the movement of neighboring pixels and thereby reduce the amplitude of acoustic emissions.

Figure 9A:
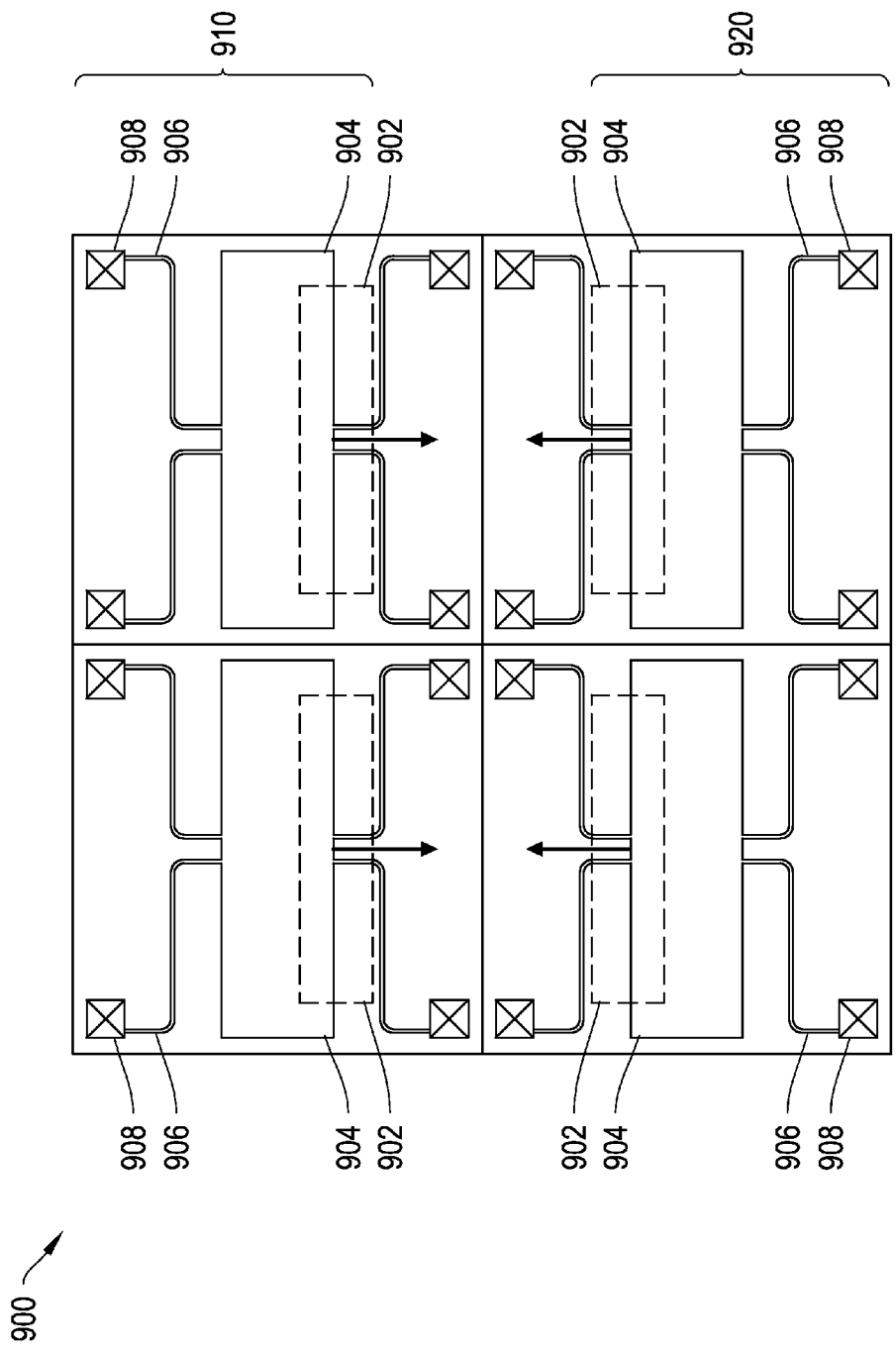
FIGS. 9A-9C depict examples of particular arrangements of two groups of light modulators in an array.
Figure 9B:
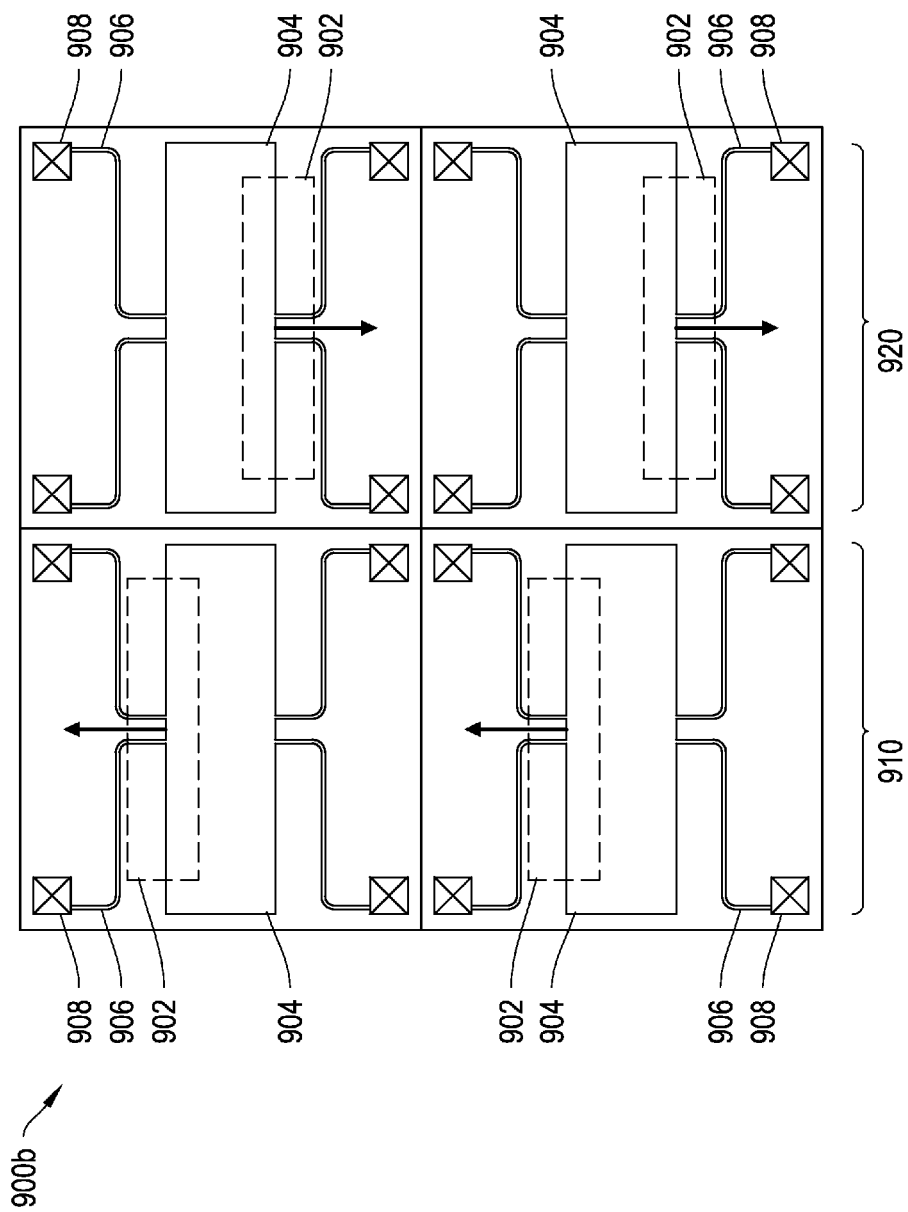
Figure 9C:
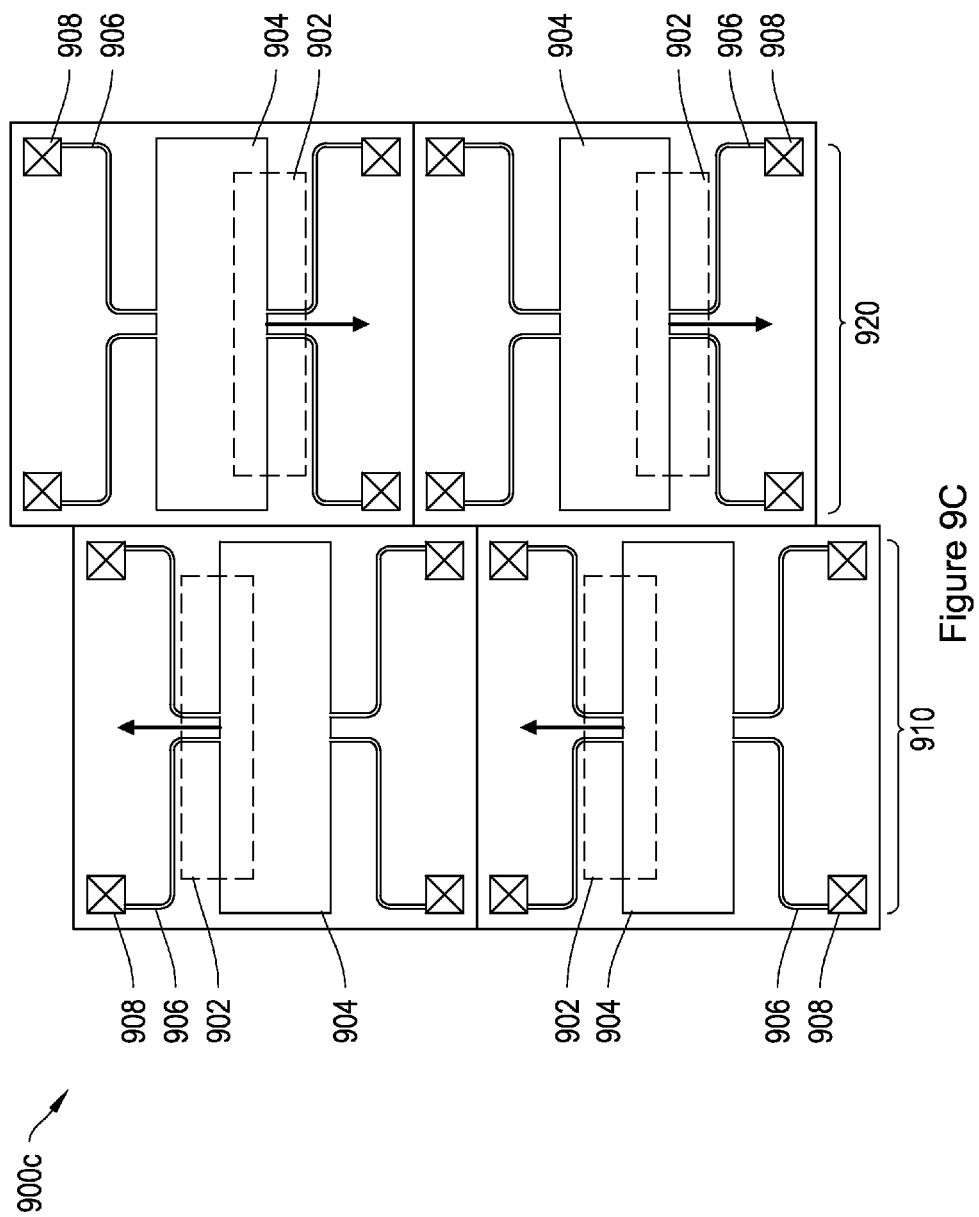

FIGS. 9A-C depict examples of particular arrangements of two groups of light modulators 910 and 920 in an array. FIGS. 9A-C adopt the vertical orientations for shutter motion illustrated in FIGS. 7A and 7B. For these vertical orientations, group "A" shutters 910 move in the up direction to reach the first active state while the group "B" shutters 920 move in the down direction to reach the first active state, as depicted in the Figure by arrows. The groups "A" 910 and "B" 920 in FIG. 9A are arranged in alternating rows, similar to Array 810 of FIG. 8A. As a consequence, shutters in neighboring columns when activated to the same active state, tend to move in the same direction, while shutters in neighboring rows tend to move either towards each other or away from each other. By contrast, the groups "A" 910 and "B" 920 in FIG. 9B are arranged in alternating columns, similar to Array 820 of FIG. 8A. As a consequence, for FIG. 9B, the shutters in neighboring rows, when actuated to the same active state, tend to move in the same direction while the shutters in neighboring columns tend to slide past each other. The shearing motion shown in FIG. 9B tends to reduce the localized pressure and therefore reduces the audible noise from the display.

In FIG. 9B, the apertures 902 in group "A" 910 are not aligned with the apertures 902 in group "B" 920. This misalignment may cause unwanted imaging artifacts in the produced image. To address this issue, the pixel arrangement for groups "A" 910 and "B" 920 in FIG. 9C have been offset to align the apertures. In this way, the light modulators still benefit from the shear effect generated from neighboring columns sliding past each other while maintaining a strict alignment of the apertures.

The light modulators in the array are provided with their different spatial relationships between shutter and corresponding apertures by arranging the positions of the shutters and apertures during the design phase of the display. The variations in spatial relationship, and the arrangements between pixels of the at least two groups of light modulators, are designed into the artwork for the photomasks for photolithographic microfabrication. The photomasks determine the patterns of the mechanical light modulators and control matrices as they are printed into the thin and thick films during microfabrication. In some implementations, as shown in FIGS. 7A and 7B, the light modulators are fabricated in a position corresponding to the inactive state. The spatial relationship of the aperture with respect to the shutter in the inactive state, however, determines the appropriate direction of motion in order to achieve the first active state.

As illustrated in FIGS. 9A and 9B, in one implementation, the positions of the shutter assemblies 904 in the inactive state may appear identical and symmetrical on the photomask regardless of their assignment to either one of the groups "A" 910 or "B" 920. The positions of the apertures 902, however can have different positions within the pixel, depending on the assignment of a particular pixel to one of the groups "A" 910 or "B" 920.

While the shutter assemblies of FIGS. 9A and 9B may appear identical and symmetrical, the control matrices (not shown) which are associated with the modulator arrays in the figures are configured to provide different signals for the actuation of the shutter assemblies, depending on their assignment to one of the groups "A" and "B", such that when driven into the first active state the shutter assemblies move in the appropriate direction with respect to their corresponding aperture. The appropriate directions are marked by the arrows in FIGS. 9A and 9B. For instance, in FIG. 9A, neighboring pixels in the same row might be caused to actuate either up or down to achieve the first active state depending on their assignment to one or the other of the groups "A" or "B".

Figure 10:
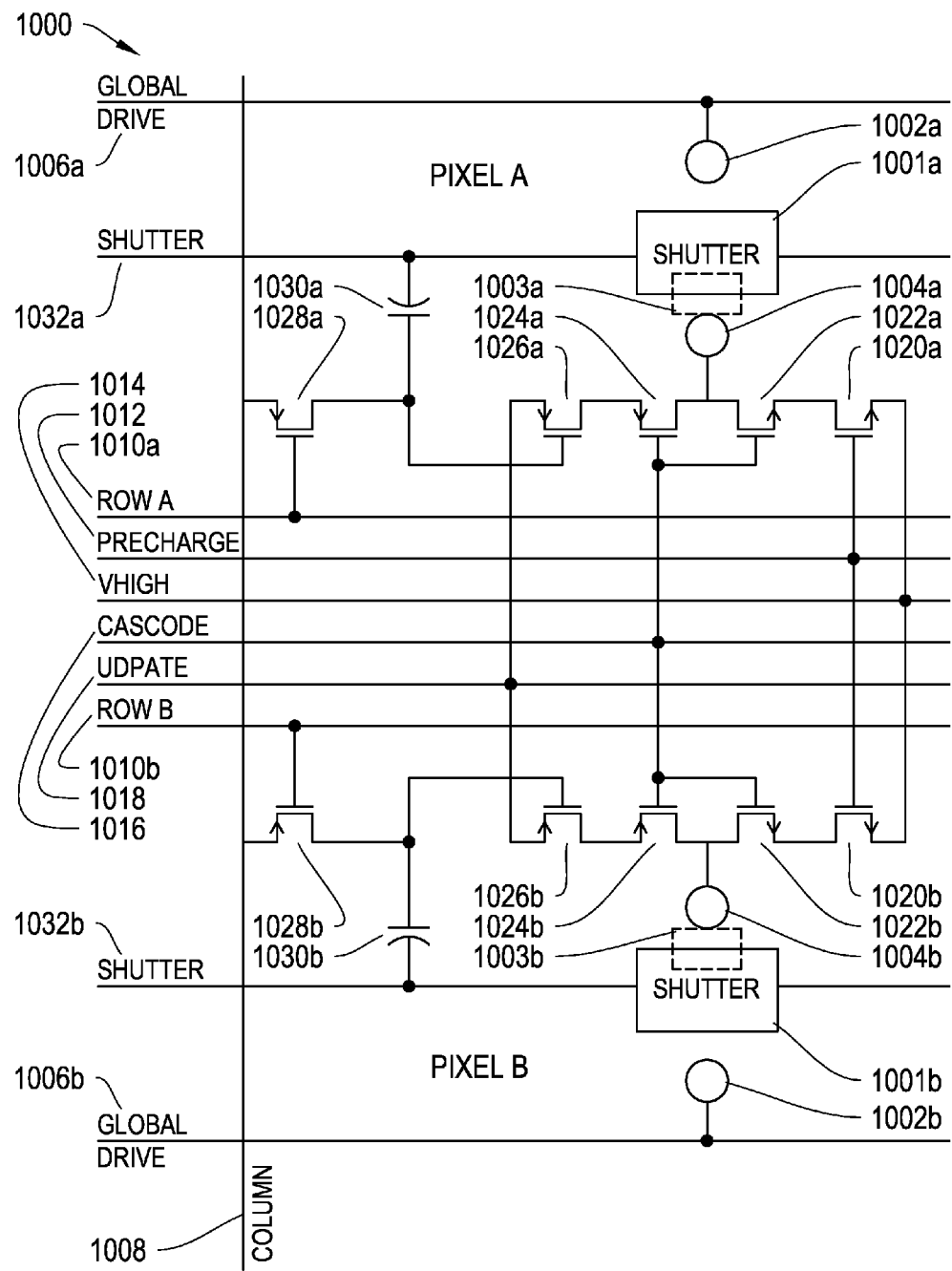
FIG. 10 is an example of a control matrix.

FIG. 10 is an example of a control matrix 1000. The control matrix 1000 of FIG. 10, based on the control matrix described in FIG. 15 of U.S. patent application Ser. No. 11/811,842, illustrates one layout of a control matrix according to an implementation. The control matrix 1000 can drive actuation towards the first active state using two different actuation directions depending on the row assignment for each of the pixels. The control circuit 1000 includes, for each pixel a shutter assembly 1001, with each shutter assembly 1001 including both a shutter-open actuator 1002 and a shutter-close actuator 1004. The row-by-row arrangement of pixels for the control matrix in FIG. 10 corresponds to the "A" and "B" group arrangements illustrated in array 810 of FIG. 8A. The figure uses lowercase letters to denote corresponding elements in the two groups. For example, to reach a closed state, shutter 1001a moves downwards to cover aperture 1003a while shutter 1001b moves upwards to cover aperture 1003b.

The control matrix 1000 includes, for a row of pixels and in some implementations shared between rows of pixels, a global drive interconnect 1006. For this example, the global drive interconnect 1006 is electrically connected to the shutter-open actuator 1002 of each shutter assembly. The control matrix 1000 also includes, for a column of pixels, a column data interconnect 1008, and for each row of pixels a scan-line interconnect 1010. The control matrix 1000 also includes several global interconnects 1012, 1014, 1016, and 1018, which are shared between multiple pixels within a row and between adjacent rows in the display. These global interconnects include a precharge interconnect 1012, a Vhigh or V-actuation interconnect 1014, a cascode interconnect 1016, and an update interconnect 1018.

The control matrix 1000 also includes, for each pixel, a shutter charge transistor 1020, a charging cascode transistor 1022, a shutter discharge transistor 1026, a discharge cascode transistor 1024, a shutter write-enable transistor 1028, and a data store capacitor 1030. When a voltage difference equal or greater than an actuation voltage is imposed across the shutter-closed actuator 1004 and shutter 1001, the shutter assembly 1001 is driven into a closed state, blocking the passage of light through aperture 1003.

As described in relation to FIG. 3, each scan-line interconnect 1010 electrically connects a write-enabling voltage source to the pixels in a corresponding row of pixels. The column data interconnect 1008 electrically connects a data voltage source ("Vd source") to the pixels in a corresponding column of pixels. The data voltage source Vd provides the majority of the actuation energy for the shutter assemblies 1001. Thus, the data voltage source also serves as an actuation voltage source.

In operation, to form an image, the control matrix 1000 write-enables each row by applying a write-enable voltage, $V_{we}$, to each scan-line interconnect 1010. For a write-enabled row, the application of $V_{we}$ to the gates of the write-enable transistors 1028 in the row allows the flow of current through the data interconnects 1008 through the transistors 1028 to apply a potential to the data store capacitor 1030. While the row is write-enabled, data voltages Vd are selectively applied to the column data interconnects 1008. The voltage Vd remains stored in the capacitor 1030 even after the control matrix 1000 ceases to apply $V_{we}$ to a row. It is not needed, therefore, to wait and hold the voltage $V_{we}$ on a row for times long enough for the shutter assembly 302 to actuate; such actuation can proceed after the write-enabling voltage has been removed from the row. The capacitors 312 also function as memory elements within the array 320, storing actuation instructions for periods as long as is necessary for the illumination of an image frame.

Despite the presence of a dual-actuator shutter assembly 1001, the control matrix 1000 includes only a single column data interconnect 1008 for each column of pixels in control matrix 1000. The cascode interconnect 1016 is connected to the gates of each of transistors 1022 and 1024. The precharge interconnect 1012, update interconnect 1018, shutter common interconnect 1032, Vhigh interconnect 1014, and cascode interconnect 1016 may be shared among pixels in multiple rows and multiple columns in the array. In one implementation, the interconnects 1012, 1018, 1032, 1014, and 1016 are shared among all pixels in control matrix 1000.

For each pixel in control matrix 1000, a charging cascode transistor 1022 is inserted with its source and drain connected in between the shutter charging transistor 1020 and the shutter-closed actuator 1004. A discharge cascode transistor 1024 is also inserted with its source and drain connected in between the shutter-closed actuator 1004 and the shutter discharge transistor 1026. The control matrix 1000 makes use of two complementary types of transistors: both p-channel and n-channel transistors. It is therefore referred to as a complementary MOS control matrix or a CMOS control matrix. While the charging transistors 1020 and 1022 are made of the pMOS type, the discharge transistors 1024 and 1026 are made of the nMOS type of transistor. In other implementations the types of transistors can be reversed, for example nMOS transistors can be used for the charging transistors 1020 and 1022 and pMOS transistors can be used for the discharge transistors 1024 and 1026. The use of a precharge interconnect 1012 along with the CMOS circuit helps to reduce the set of voltage variations needed to achieve shutter actuation.

The source of shutter charging transistor 1020 is electrically connected to the Vhigh interconnect 1014 while the gate is connect to the precharge interconnect 1012. Throughout operation, the Vhigh interconnect 1014 is maintained at a constant voltage equal to the actuation voltage $V_{at}$. In alternate implementations, the Vhigh interconnect 1014 is connected to either a voltage source or a current source at the periphery of the display, or more generally an energy source. The precharge interconnect 1012 is maintained at the same actuation voltage $V_{at}$ as that of the Vhigh interconnect 1014 whenever the shutter charge transistor 1020 is to held in the off state. In order to turn on the shutter charge transistor 1020, the voltage on the precharge interconnect 1012 is reduced so that the voltage difference between the Vhigh interconnect 1014 and the precharge interconnect 1012 is greater than the threshold voltage of the shutter charge transistor 1020. In some implementations, threshold voltage can vary in a range from 2 to 8 volts. In one implementation where the shutter charging transistor is a pMOS transistor, both the Vhigh interconnect 1014 and the precharge interconnect 1012 are held at a $V_{at}$ of 40 volts when the shutter charging transistor 1020 is off. In order to turn shutter charging transistor 1020 on, the voltage on the Vhigh interconnect 1014 would remain at 40 volts while the voltage on the precharge interconnect 1012 is temporarily reduced to 35 volts. If an nMOS transistor is used for shutter charging transistor 1020, then the $V_{at}$ would be −40 volts and a precharge interconnect voltage of −35 volts would be sufficient to turn the transistor on.

The addition of the charging cascode transistor 1022 helps to reduce the voltage drops experienced across either the source and drain or the gate and drain for either of the shutter charging transistor 1020 or the charging cascode transistor 1022. The addition of the discharge cascode transistor 1024 helps to reduce the voltage drops experienced across either the source and drain or the gate and drain for either of the shutter discharging transistor 1026 or discharge cascode transistor 1024. The proper voltage applied to the cascode interconnect 1016 ensures that both charging transistors 1020 and 1024 turn on at substantially the same time. The same voltage helps to ensure that the discharge transistors 1024 and 1026 turn on at substantially the same time. In operation the cascode interconnect 1016 is held to a constant voltage of about half of the actuation voltage $V_{at}$. During a charging operation, i.e. when the precharge interconnect 1012 is reduced in voltage below $V_{at}$ such that shutter charging transistor 1020 is turned on, a voltage will then appear between the gate and drain of charging cascode transistor 1022 such that the transistor 1022 will also turn on. If the gate of transistor 1022 is held at about half of the actuation voltage $V_{at}$ then the source to drain voltage of transistor 1022 is unlikely to exceed one half $V_{at}$ plus about a threshold voltage, even though the voltage imposed at the Vhigh interconnect 1014 remains at $V_{at}$ (for example, 40 volts). The source to drain voltage of shutter charging transistor 1020 then experiences the difference between $V_{at}$ and the voltage across charging cascode transistor 1022. As a result, even though a large voltage $V_{at}$ is imposed at Vhigh interconnect 1014, i.e. a voltage large enough to cause catastrophic breakdown in anyone of the transistors, the control matrix 1000 is designed such that only a fraction of $V_{at}$ ever appears across any of the individual transistors, thereby protecting the circuit.

Similarly, during a discharge operation, i.e. when a charge is stored on data store capacitor 1030 and the update interconnect 1018 is brought to zero volts, a voltage will then appear between the gate and drain of discharge cascode transistor 1024 such that transistor 1024 will also turn on in addition to transistor shutter discharge transistor 1026. If the gate of discharge cascode transistor 1024 is held at about half of the actuation voltage $V_{at}$ then the source to drain voltage of discharge cascode transistor 1024 is unlikely to exceed one half $V_{at}$ plus about a threshold voltage, even though the voltage difference between the shutter close actuator 1004 and the update interconnect can be as high as $V_{at}$ (for example, 40 volts). The source to drain voltage of shutter discharge transistor 1026 then experiences the difference between $V_{at}$ and the voltage across discharge cascode transistor 1024. As a result, even though a large voltage $V_{at}$ is dropped between the shutter closed actuator 1006 and the shutter common interconnect 1032, i.e. a voltage large enough to cause catastrophic breakdown in anyone of the transistors, the control matrix 1000 is designed such that only a fraction of $V_{at}$ ever appears across any of the individual transistors, thereby protecting the circuit.

The control of pixels with two different directions of travel is evident from inspection of the circuit layout in FIG. 10. While the circuit layout for Pixel A and Pixel B are similar, the spatial orientation of the shutter 1001 with respect to aperture 1003 are reversed in the two rows. Accordingly, the shutter-closed actuator 1004a of Pixel A is connected such that the shutter 1001a will move down and towards its corresponding aperture 1003a after the control matrix for that pixel receives a shutter-close signal from its corresponding data interconnect 1010a. Conversely, the shutter-closed actuator 1004b of Pixel B is connected such that the shutter 1001b will move up and towards its corresponding aperture 1003b after the control matrix for that pixel receives a shutter-close signal. In this way, the same shutter-close command can cause the shutter 1001 to move in a different direction according to which group "A" or "B" the pixel belongs to.

The circuit arrangement for the control matrix 1000 in FIG. 10 works out in a space efficient way because all of the shutter assemblies in the same row, or all of the shutter assemblies that share a common scan-line interconnect 1010, are designed for shutter motion in the same direction (the "up" or "down" direction) upon receipt of a command to move towards the same active state (either the "closed" or the "open" state). The shutter assemblies in adjacent rows, for instance the rows that share certain global common interconnects, can be designed to move in alternate directions.

In an alternate implementation of a control circuit, each row in the array is assigned its own set of global interconnects such as the global drive interconnect 1006, precharge interconnect 1012, the Vhigh or V-actuation interconnect 1014, the cascode interconnect 1016, and the update interconnect 1018. To achieve an arrangement of alternating direction of motion for the shutter assemblies, however, the global drive signal is routed from one side of the shutter assembly to the other depending on the direction of motion desired for that pixel. For example, circuit connections to the shutter cascode transistors 1022 and 1024 would also have to be routed from one side of the shutter assembly to the other. These extra circuit routing lines can be drawn into a photomask, but at the cost of space for aperture area within the pixel.

Figure 11:
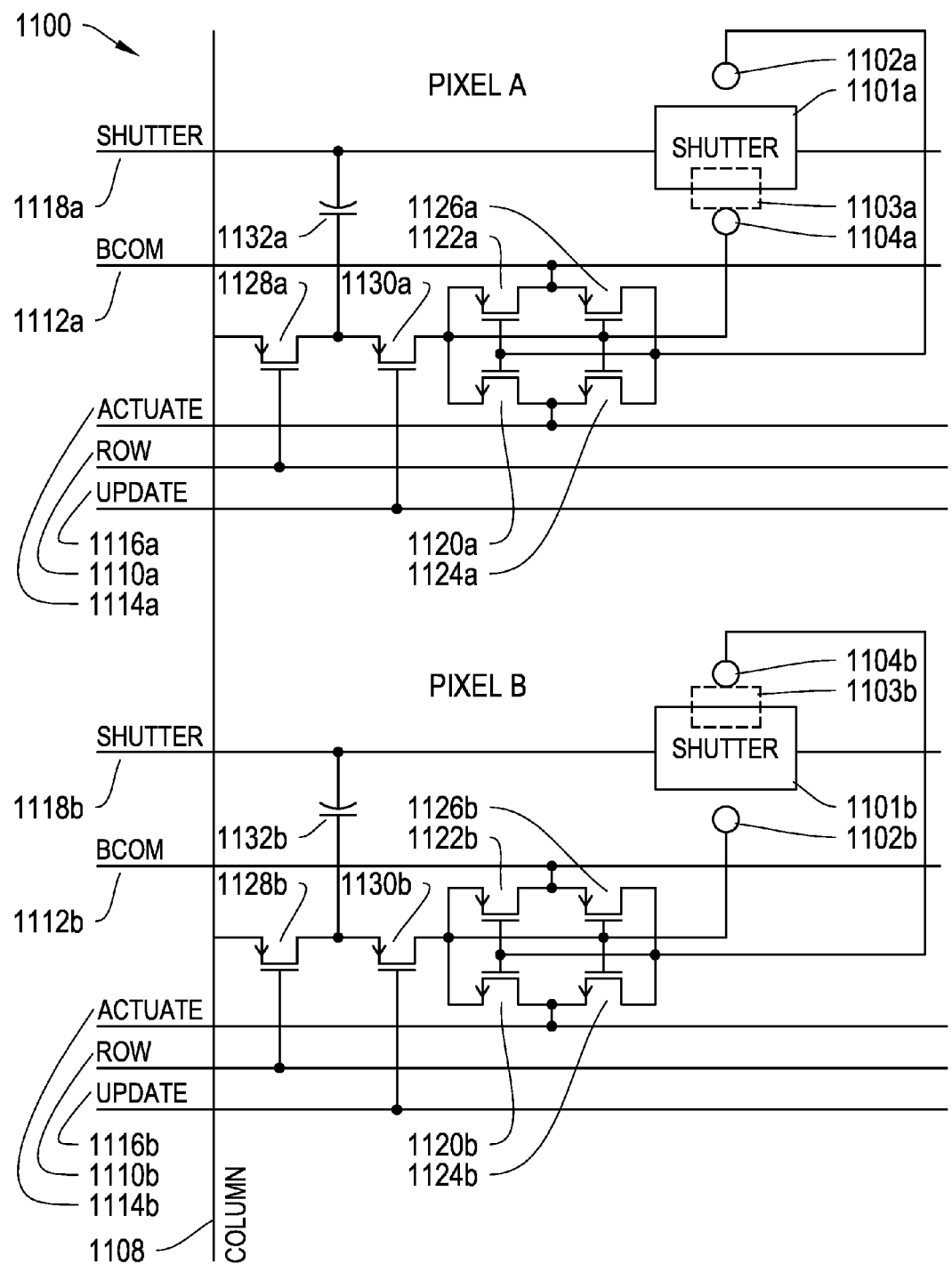
FIG. 11 is an example of an alternate control matrix.

FIG. 11 is an example of an alternate control matrix 1100. The control matrix 1100 of FIG. 11, similar to that described in FIG. 5A of U.S. patent application Ser. No. 12/652,477, illustrates a control matrix, which drives actuation towards the same first active state using two different actuation directions depending on either the row or column assignment for each pixel. The control matrix 1100 includes, for each pixel a shutter assembly 1101, with each shutter assembly including both a shutter-open actuator 1102 and a shutter-close actuator 1104. As in FIG. 10, the row-by-row arrangement of pixels for the control matrix in FIG. 11 corresponds to the "A" and "B" group arrangements illustrated in array 810 of FIG. 8. For example, to reach a closed state, shutter 1101a moves downwards to cover aperture 1103a while shutter 1101b moves upwards to cover aperture 1103b.

The control matrix illustrated in FIG. 11 does not include an update interconnect, but instead provides a flip-flop or latch arrangement of transistors which control both the shutter-open actuator 1102 and the shutter-closed actuator 1104 for each pixel. The control matrix 1100 also includes, for a column of pixels, a column data interconnect 1108, and for each row of pixels, a scan-line interconnect 1110. The control matrix 1100 also includes several global interconnects which may be shared between multiple pixels and multiple rows in the display. These global interconnects include the BCOM interconnect 1112, the actuation or V-actuation interconnect 1114, and the update interconnect 1116.

The control matrix illustrated in FIG. 11 also includes, for each pixel, a shutter-open charge transistor 1124, a shutter-open discharge transistor 1126, a shutter-close charge transistor 1120, and a shutter-close discharge transistor 1122, a shutter write-enable transistor 1128, a shutter flip-flop-enable transistor 1130, and a data store capacitor 1132. When a voltage difference equal or greater than an actuation voltage $V_{at}$ is imposed across the shutter-close actuator 1104 and shutter 1101, the shutter assembly 1101 is driven into a closed state, blocking the passage of light through aperture 1103.

The control matrix 1100 makes use of two complementary types of transistors: both p-channel and n-channel transistors. It is therefore referred to as a complementary MOS control matrix or a CMOS control matrix. While the write-enable transistor 1128, shutter flip-flop transistor 1130 and the discharge transistors 1122 and 1126 are made of the nMOS type, the charge transistors 1120 and 1124 are made of the pMOS type of transistor. Those having ordinary skill in the art will recognize that in other implementations, the types of CMOS transistors can be reversed (i.e., pMOS switched with nMOS), or other types of transistors may be used (i.e., BJT, JFET or any other suitable type of transistor).

In some implementations, actuation interconnect 1114 is connected to a voltage source that is maintained equal to or greater than an actuation voltage $V_{at}$. The shutter interconnect 118 is maintained near the ground potential. In some implementations, the shutter polarity may be maintained at the full actuation voltage (e.g., approximately 25 volts). In certain implementations, the polarity of the shutter interconnect 1118 may be periodically alternated between one or more potentials. For example, the shutter interconnect 1118 may be alternated between 25 volts and 0 volts after each full video frame, or in other cases, more or less frequently. The shutter polarity may be controlled by applying the proper voltage to the shutter interconnect 1118. In some implementations, the polarity of the data is alternated, as well, corresponding to the shutter potential being alternated.

Each shutter actuator 1102 and 1104 is connected to actuation interconnect 1114 depending on the "on/off" state of its respective charge transistor 1124 and 1120. For example, when the shutter open charge transistor 1124, which is connected to the shutter open actuator 1102, is in an "on" state, charge is allowed to flow from the actuation interconnect 1114 to the shutter open actuator 1102. Then, a voltage of approximately $V_{at}$ will be imposed between the shutter open actuator 1102 and the shutter interconnect 1118 (assuming the shutter interconnect 1118 is at common potential), and the shutter will be driven into an open state. A similar process occurs when shutter open charge transistor 1124 is in an "off" state and shutter close charge transistor 1120 is in an "on" state, which results in driving the shutter into the opposite state. In some implementations, a voltage of approximately $V_{at}$ will be applied to the shutter open actuator 1102 and a similar voltage applied to the shutter 1101, thereby creating a 0 volt potential between the shutter 1101 and the actuator 1102.

The control matrix 1100 includes a data store capacitor 1132. As described above, the data store capacitor 1132 stores, by means of stored charge, "data" instructions (e.g., open or close) that are sent by a controller, such as controller 156, to the pixel as part of a data loading or writing operation. The voltage stored on the capacitor 1132 determines, in part, the latch state of the transistors 1120, 1122, 1124, and 1126 in control matrix 1100. During a data load operation, each row of the array is write-enabled in an addressing sequence. The voltage sources in control matrix 1100 (not shown) apply a write-enabling voltage to the row interconnect 1110 corresponding to a selected row. The application of a voltage to the row interconnect 1110 for the write-enabled row turns on the write-enable transistor 1128 of the pixels in the corresponding row line, thereby write enabling the pixels. While a selected row of pixels is write-enabled, data voltage sources apply appropriate data voltages to the column interconnect 1108 corresponding to each column of pixels in the control matrix 1100. The voltages applied to the column interconnects 1108 are thereby stored on the data store capacitors 1132 of the respective pixels. In certain implementations, the voltages applied to the column interconnect 1108 may be negative or positive (e.g., ranging from −5 to 5 volts).

After all data for the next state has been stored on capacitors 1132 in the selected rows in the data loading step, the control matrix 1100 then proceeds to update portions or banks of the pixels, or the entire display to the next held state. The update latch sequence begins by bringing the voltage on the actuation interconnect 1114 down, or close, to the voltage on the BCOM interconnect 1112. This brings the voltages on both the shutter open and shutter closed actuators 1102 and 1104 close to the same voltage as the BCOM interconnect 1112. Next, the update interconnect 1116 is brought to an actuation voltage $V_{at}$, thereby switching the shutter flip-flop transistor 1130 to a conductive "on" state and allowing the stored data to be passed from the data store capacitor 1132 to the transistors 1120-1126 of the cross-coupled inverter latch. If the update interconnect 1116 is activated too early after the actuation interconnect 1114 voltage is brought to the BCOM interconnect 1112 voltage, the stored next state of the next state data can be corrupted by present state data of the latch that has not had enough time to decay away. This non-overlap timing can be a function of circuit parasitics, transistor threshold voltages, capacitor size and stored data voltage levels. For example, the delay needed may be approximately 10 μs. However this delay time may be considerably longer or shorter depending on the display.

An intermediate voltage just high enough to make the latch transistors 1120-1126 operate (e.g. approximately equal to the sum of the threshold voltages of the inverter transistors 1124 and 1126 or 1120 and 1122. The level can be significantly less, limited by the details of needed timings, parasitic charge injections, detailed transistor characteristics, and the like) is applied to the actuation interconnect 1114. The intermediate voltage applied to the actuation interconnect 114 functions to minimize the power used to latch to the next state. In certain implementations, the cross-coupled inverter latch is latched at as low an intermediate voltage level as can be reliably performed in order to reduce overall transient switching power. The data stored on data store capacitor 538 is latched in the cross-coupled inverter latch including transistors 1120-1126. Applying the intermediate voltage may be performed simultaneously to, before or after activating the update interconnect 1116. For example, in certain implementations, applying an intermediate voltage to the actuation interconnect 1114 can be done completely after the update pulse or the intermediate voltage pulse can partially or fully overlap with the update voltage pulse. In some implementations, control of the next state of the cross-coupled inverter latch is executed by overlap of the two states, particularly if parasitic capacitances of the data latch are low.

Finally, the update interconnect 1116 is brought to close to ground potential, thereby switching the shutter flip-flop transistor 1130 to a non-conductive "off" state and isolating the data store capacitor 1132 from the cross-coupled inverter latch of pixel 504. By inactivating the update interconnect 1116 before raising the actuation interconnect 1114 to full voltage, significant power is conserved by not allowing the data storage capacitor 1132 to be charged to the full actuation voltage.

In some implementations, it is possible to not have the shutter flip-flop transistor 1130, at all. In this case, the data loading operation would directly change the latch state as it is loaded row by row. This could happen by simultaneously lowering the actuation interconnect 1114 to the appropriate intermediate level or to approximately ground potential then to the intermediate level on a row by row basis as well to allow for lower data voltages to determine the latch state, or by lowering the actuation interconnect 1114 for the entire display to an appropriate intermediate level during the entire data loading operation. Alternatively, if power is not a concern, or the actuation voltages are low enough to make the power a secondary concern, the data voltages could be at full actuation voltage levels, or more, with the actuation interconnect 1114 maintained at the full $V_{at}$, to force the latch to the desired state. Also, by eliminating shutter flip-flop transistor 1130, layout area may be saved.

Once the data has been transferred and the latch state updated, the control matrix 1100 proceeds with actuating the shutter 1101 to its next state. First, the actuation interconnect 1114 is brought to full actuation voltage $V_{at}$. Full actuation voltage may be the voltage needed to actuate the shutter to one side or the other and to hold the shutter in that position until the next frame addressing cycle. Because the latch state was set earlier, there is no conduction path from the actuation interconnect 114 through the two transistors in series in each inverter (1124 and 1126 or 1120 and 1122). Thus, only current meant to charge the actuation of the shutter capacitance and various parasitic capacitance is allowed to flow, resulting in minimal power dissipation.

It is evident by inspection of FIG. 11 that the actuators 1104a and 1102b, which are closest to the latch circuit in the two pixels, are wired differently to the transistors in the latch circuit. The bottom actuator 1104a for pixel A is connected to shutter-close charge transistor 1120a and shutter-close discharge transistor 1122a, and is therefore wired to respond to the shutter-closed state of the latch circuit. In contrast, the bottom actuator 1102b for pixel B is connected to shutter-open charge transistor 1124b and shutter-open discharge transistor 1126b, and is thus wired to respond to the shutter-open state of the latch circuit. In this fashion, it is evident that the control circuit in pixel A is configured to drive the shutter 1101a down and towards the aperture 1103a upon receipt of a shutter-close command from the corresponding data interconnect 1114a, while the control circuit in pixel B is configured to drive the shutter 1101b up and towards the aperture 1103b upon receipt of a shutter-close command from the corresponding data interconnect 1114b. In this way, the same shutter-close command can cause the shutter 1101 to move in a different direction according to which group "A" or "B" the pixel belongs to.

The control circuit in FIG. 11 can be configured for many alternative pixel arrangements, each including two groups of pixels which respond by moving in two different directions upon receipt of a command for movement towards the same active state (either the "closed" or the "open" state). The two groups of "A" and "B" pixels can be arranged in alternating rows, alternating columns, alternate clusters of modulators, or even be randomly arranged throughout the pixel array. All that is needed to specify the direction of motion for a particular shutter, upon receipt of a shutter-close actuate signal, is to arrange the wiring of that shutter's actuators to one or the other of the two data states in the latch circuit.

In an alternate implementation, the control circuit does not need a distinct layout or wiring pattern for each of the two groups of pixels ("A" and "B"), for accomplishing the two different directions of motion. The control of pre-specified and alternating arrangements of pixel motion can be accomplished through prior processing of the pixel data before it is sent to the control matrix. In this implementation, the two different spatial relationships of the pixels are still laid out in the photomasks in a pre-determined manner, for instance by alternating the positions of the apertures in the pixels as is illustrated in FIG. 9A or 9B. The spatial relationship between shutters and the apertures in a pixel determines a pre-set direction of motion needed in response to a command to move towards a first active state. In this implementation, however, a data processor stores a map of the pre-set directions of motion for each of the pixels in the array. Upon receipt of a command to set pixels into a first active state, the data processor determines from memory which direction of motion is needed to achieve the first active state for each of the pixels in the array. Depending on this information, the data processor then sends a "move up" or "move down" command to each of the pixels depending on which direction of motion is pre-set to correspond to the first active state for that pixel. In alternate implementations the data processor determines other types of motion which correspond to the 2 pre-set directions for actuating pixels in the array, which could be "move left" versus "move right" directions or could be "move clockwise" versus "move counter-clockwise" directions.

The apparatus and methods disclosed herein-may be embodied in other specific forms without departing from the spirit or essential characteristics thereof. The forgoing implementations are therefore to be considered in all respects illustrative, rather than limiting.

What is claimed is:

1. A display comprising:
 a substrate;
 an array of apertures formed on the substrate; and
 an array of MEMS light modulators spaced away from the array of apertures, the array of MEMS light modulators comprising:
 a first group of MEMS light modulators capable of being driven from a light blocking state to a light-transmissive state through movement in a first direction substantially along a first axis, the first group comprising a plurality of first linear arrangements of MEMS light modulators, and
 a second group of MEMS light modulators capable of being driven from a light blocking state to a light-transmissive state through movement in a second direction substantially along a second axis
 oriented by one of about 45 degrees, about 60 degrees, or about 90 degrees relative to the first axis, the second group comprising a plurality of second linear arrangements of MEMS light modulators interdigitated with the first linear arrangements.

2. The display of claim 1, wherein the second linear arrangements interdigitated with the first linear arrangements are defined by alternating groups of rows of the first and second groups of MEMS light modulators.

3. The display of claim 2, wherein a spatial period of alternation between the alternating groups of rows of MEMS light modulators is less than about the thickness of the substrate.

4. The display of claim 1, wherein the second linear arrangements interdigitated with the first linear arrangements are defined by alternating groups of columns of the first and second groups of light modulators.

5. The display of claim 4, wherein a spatial period of alternation between the alternating groups of columns of MEMS light modulators is less than about the thickness of the substrate.

6. The display of claim 1, wherein the second linear arrangements interdigitated with the first linear arrangements are defined by alternating clusters of the first and second groups of light modulators, wherein each cluster comprises at least one light modulator.

7. The display of claim 1, wherein each MEMS light modulator in the array includes a shutter.

8. The display of claim 1, wherein the first and second group of MEMS light modulators include a third state which partially allows light to pass through a corresponding aperture.

9. The display of claim 1, further including a controller including a driver chip and a controller matrix for transmitting data and actuation voltages to the array of MEMS light modulators.

10. The display of claim 9, wherein the controller matrix is capable of actuating the first group of MEMS light modulators in the first direction and the second group of light modulators in the second direction in response to a control signal to move the light modulators from the light-blocking state to the light-transmissive state.

11. The display of claim 9, wherein the controller stores in memory which of the first and second directions of movement is appropriate to achieve the light-transmissive state for each MEMS light modulator in the array.

12. The display of claim 1, wherein the substrate is a transparent substrate.

13. A method for manufacturing a display, comprising:
 forming an array of apertures on a substrate,
 forming a first group of MEMS light modulators on the substrate spaced away from the array of apertures such that the light modulators in the first group of MEMS light modulators are capable of actuating from a light-blocking state to a light-transmissive state through movement in a first direction substantially along a first axis, the first group comprising a plurality of first linear arrangements of MEMS light modulators, forming a second group of MEMS light modulators on the substrate spaced away from the array of apertures such that the light modulators in the second group of MEMS light modulators are capable of actuating from a light-blocking state to a light-transmissive state through movement in a second direction substantially along a second axis oriented by one of about 45 degrees, about 60 degrees, and about 90 degrees relative to the first axis, the second group comprising a plurality of second linear arrangements of MEMS light modulators interdigitated with the first linear arrangements.

14. The method of claim 13, wherein the second linear arrangements interdigitated with the first linear arrangements are defined by alternating groups of rows of the first and second groups of MEMS light modulators.

15. The method of claim 14, wherein a spatial period of alternation between the alternating groups of MEMS light modulators is less than about the thickness of the substrate.

16. The method of claim 13, wherein the second linear arrangements interdigitated with the first linear arrangements are defined by alternating groups of columns of the first and second groups of MEMS light modulators.

17. The method of claim 16, wherein a spatial period of alternation between the alternating groups of MEMS light modulators is less than about the thickness of the substrate.

18. The method of claim 13, wherein the second linear arrangements interdigitated with the first linear arrangements are defined by alternating clusters of the first and second group of MEMS light modulators, wherein each cluster comprises at least one light modulator.

19. The method of claim 13, further comprising forming a control matrix onto the substrate for transmitting data and actuation voltages to the array of MEMS light modulators and electrically coupling a controller to the control matrix, the controller including a memory for storing which of the first and second directions of movement is appropriate to achieve the light-transmissive state for each MEMS light modulator in the array.

20. The method of claim 13, wherein the substrate is a transparent substrate.

21. A system for modulating light to form an image on a display including an array of apertures on a substrate and an array of MEMS light modulators spaced away from the array of apertures, comprising:

means for actuating a first group of MEMS light modulators in the array of MEMS light modulators from a light-blocking state to a light-transmissive state by initiating movement of the MEMS light modulators in a first direction substantially along a first axis, the first group comprising a plurality of first linear arrangements of MEMS light modulators, and means for actuating a second group of MEMS light modulators in the array of MEMS light modulators from a light-blocking state to a light-transmissive state by initiating movement of the MEMS light modulators in a second direction substantially along a second axis orientated oriented by one of about 45 degrees, about 60 degrees, and about 90 degrees relative to the first axis, the second group comprising a plurality of second linear arrangements of MEMS light modulators interdigitated with the first linear arrangements.

22. The system of claim 21, further comprising means for determining which of the first and second directions of movement is appropriate to achieve the light-transmissive state for each MEMS light modulator in the array and means for transmitting data and actuation voltages to the array of MEMS light modulators.

23. The system of claim 21, wherein the substrate is a transparent substrate.

24. The system of claim 21, wherein the second linear arrangements interdigitated with the first linear arrangements are defined by alternating groups of rows of the first and second groups of MEMS light modulators.

25. The system of claim 24, wherein a spatial period of alternation between the alternating groups of columns of MEMS light modulators is less than about the thickness of the substrate.

26. The system of claim 21, further including a controller including a driver chip and a controller matrix for transmitting data and actuation voltages to the array of MEMS light modulators.

27. The system of claim 26, wherein the controller stores in memory which of the first and second directions of movement is appropriate to achieve the light-transmissive state for each MEMS light modulator in the array.

28. The system of claim 27, wherein the control matrix is configured with wiring layouts for actuating the two groups in substantially different directions.

29. The system of claim 27, wherein the controller stores in memory a map of the first and second groups of light modulators in the array and their associated direction of movement to achieve an active state.

30. The system of claim 29, wherein the controller processes pixel data prior to sending the pixel data to the control matrix to determine the proper direction of movement for each pixel.

31. The display of claim 11, wherein the control matrix is configured with wiring layouts for actuating the two groups in substantially different directions.

32. The display of claim 11, wherein the controller stores in memory a map of the first and second groups of light modulators in the array and their associated direction of movement to achieve an active state.

33. The display of claim 27, wherein the controller processes pixel data prior to sending the pixel data to the control matrix to determine the proper direction of movement for each pixel.

* * * * *